(12) United States Patent
Kimura

(10) Patent No.: US 9,389,889 B2
(45) Date of Patent: Jul. 12, 2016

(54) APPLICATION SERVER FOR OPTIMIZING TIMING OF PERFORMING DYNAMIC COMPILATION

(71) Applicant: FUJITSU LIMITED, Kawasaki (JP)

(72) Inventor: Yukihiro Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 13/661,089

(22) Filed: Oct. 26, 2012

(65) Prior Publication Data

US 2013/0125102 A1 May 16, 2013

(30) Foreign Application Priority Data

Nov. 16, 2011 (JP) .................. 2011-251127

(51) Int. Cl.
*G06F 9/45* (2006.01)
*G06F 9/455* (2006.01)

(52) U.S. Cl.
CPC .................... *G06F 9/4552* (2013.01)

(58) Field of Classification Search
USPC ......................................... 717/148
See application file for complete search history.

(56) References Cited

U.S. PATENT DOCUMENTS

| 6,792,460 B2* | 9/2004 | Oulu et al. ..................... 709/224 |
| 7,844,960 B2* | 11/2010 | Inglis et al. .................... 717/153 |
| 2005/0102657 A1* | 5/2005 | Lewis ............................ 717/140 |
| 2007/0226715 A1* | 9/2007 | Kimura et al. ................. 717/148 |

FOREIGN PATENT DOCUMENTS

| JP | 2007-213490 A | 8/2007 |
| JP | 2009-9253 A | 1/2009 |
| JP | 2011-2976 A | 1/2011 |

OTHER PUBLICATIONS

Japanese Office Action mailed May 12, 2015 for corresponding Japanese Patent Application No. 2011-251127, with Partial English Translation, 3 pages.

* cited by examiner

*Primary Examiner* — Hang Pan
(74) *Attorney, Agent, or Firm* — Fujitsu Patent Center

(57) ABSTRACT

In dynamic compilation, timing of compiling is set for each method in accordance with information such as an execution frequency for each method so that methods having a large influence on the execution performance of the entire application program are compiled earlier. Thereby, the balance of execution is optimized between execution by an interpreter and execution based on native codes, and the execution performance immediately after the activation of an application program becomes stable.

17 Claims, 37 Drawing Sheets

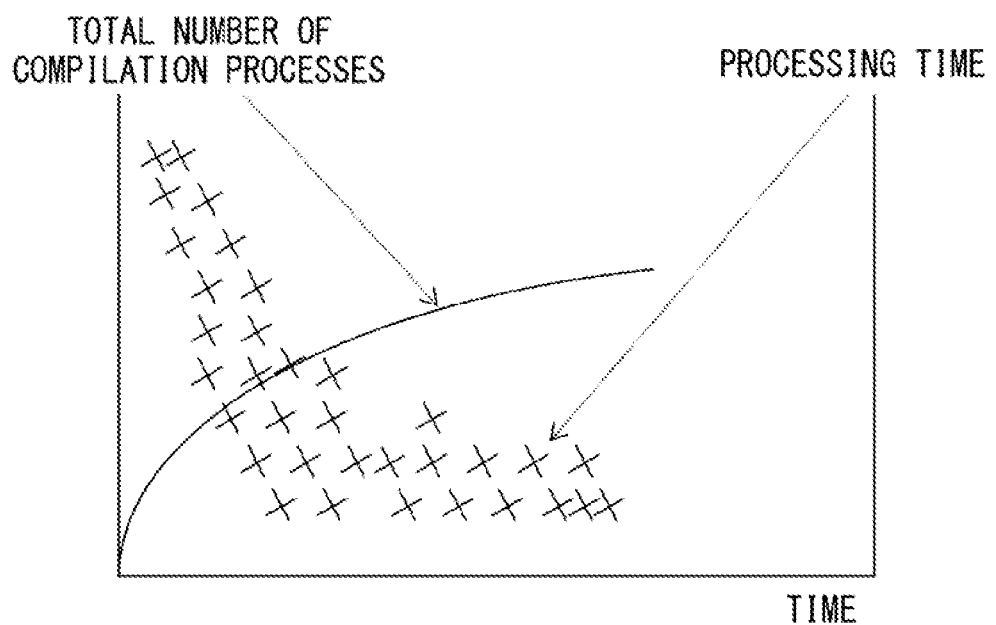
F I G. 1

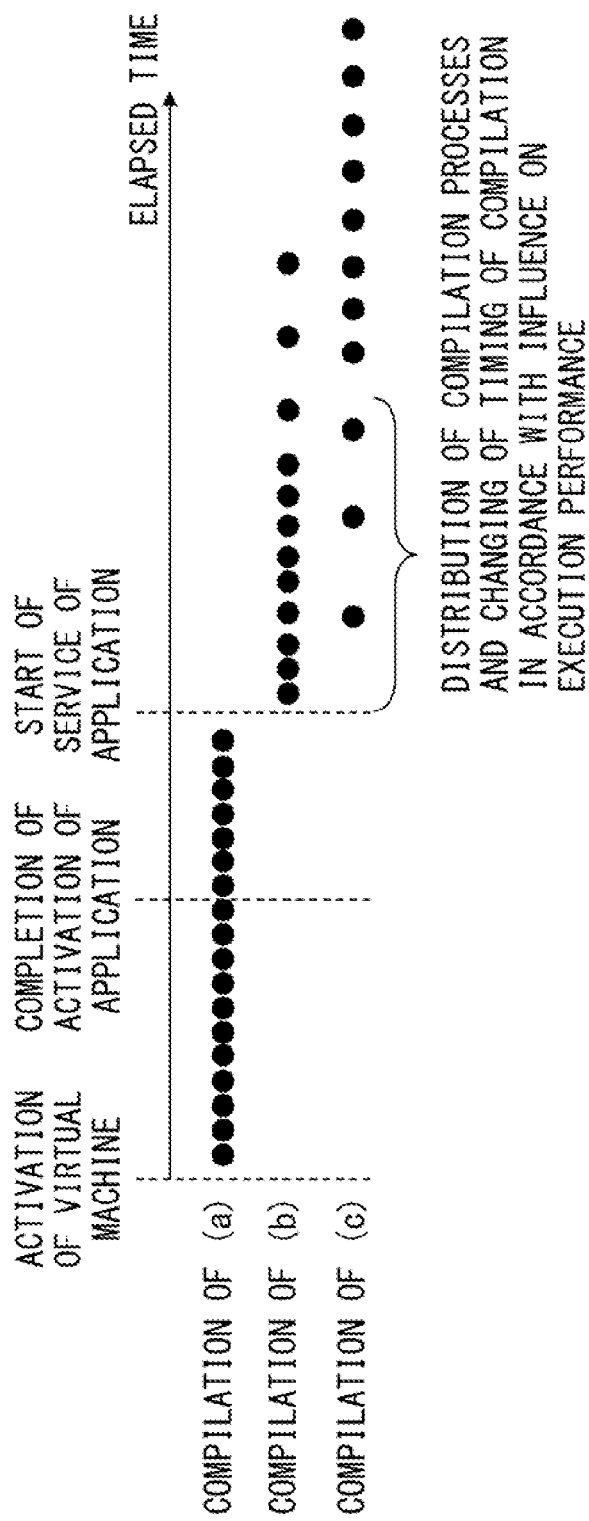
F I G. 4

| UNSTABLE PERIOD<br><br>PERFORMANCE DIFFERENCE BETWEEN BEFORE STABLE PERIODS AND AFTER STABLE PERIODS | SHORT | LONG |
|---|---|---|
| SMALL | | CASE 2<br>• COMPILATION ADVANCES GRADUALLY<br>(SHIFT SLOWLY FROM EXECUTION BY INTERPRETER TO EXECUTION BASED ON NATIVE CODE) |
| LARGE | CASE 1<br>• COMPILATION CONCENTRATES TO SHORT PERIOD IMMEDIATELY AFTER STARTING OPERATION | CASE 3<br>• COMPILATION CONCENTRATION CONTINUES FOR LONG TIME<br>• PERFORMANCE DIFFERENCE IS LARGE BETWEEN EXECUTION BY INTERPRETER AND EXECUTION BASED ON NATIVE CODE |

F I G. 8

| IMPORTANCE / CONCENTRATION DEGREE | IMPORTANCE 1 (VERY IMPORTANT) | IMPORTANCE 2 (IMPORTANT) | IMPORTANCE 3 (ORDINARY) | IMPORTANCE 4 (NOT SO IMPORTANT) |
|---|---|---|---|---|
| HIGH CONCENTRATION DEGREE | EXPEDITE (THE LARGER PERFORMANCE DIFFERENCE IS, THE MORE TIMING IS EXPEDITED. HOWEVER WHEN CONCENTRATION PERIOD COINCIDES WITH UNSTABLE PERIOD, TIMING IS EXPEDITED SLIGHTLY) | WHEN CONCENTRATION PERIOD AND UNSTABLE PERIOD COINCIDE, TIMING IS DELAYED | DELAY | DELAY (THE LARGER PERFORMANCE DIFFERENCE IS, THE MORE TIMING IS DELAYED. HOWEVER WHEN UNSTABLE PERIOD IS LONGER THAN CONCENTRATION PERIOD, TIMING IS DELAYED SLIGHTLY) |
| INTERMEDIATE CONCENTRATION DEGREE | EXPEDITED (THE LARGER PERFORMANCE DIFFERENCE IS, THE MORE TIMING IS EXPEDITED) | — | — | DELAYED (THE LARGER PERFORMANCE DIFFERENCE IS, THE MORE TIMING IS DELAYED) |
| LOW CONCENTRATION DEGREE | EXPEDITED (THE LARGER PERFORMANCE DIFFERENCE IS, THE MORE TIMING IS EXPEDITED) | EXPEDITED | (WHEN UNSTABLE PERIOD IS LONGER THAN CONCENTRATION PERIOD, TIMING IS EXPEDITED) | DELAYED (THE LARGER PERFORMANCE DIFFERENCE IS, THE MORE TIMING IS DELAYED) |

FIG. 10

| IMPORTANCE / CONCEN-TRATION DEGREE | IMPORTANCE 1 (VERY IMPORTANT) | IMPORTANCE 2 (IMPORTANT) | IMPORTANCE 3 (ORDINARY) | IMPORTANCE 4 (NOT SO IMPORTANT) |
|---|---|---|---|---|
| HIGH CONCENTRATION DEGREE | IF (UNSTABLE PERIOD/CONCENTRATION PERIOD) ≦ 1.2<br>LARGE PERFORMANCE DIFFERENCE : 0.7<br>SMALL PERFORMANCE DIFFERENCE : 0.9<br>IF (UNSTABLE PERIOD)/(CONCENTRATION PERIOD) > 1.2<br>LARGE PERFORMANCE DIFFERENCE : 0.5<br>SMALL PERFORMANCE DIFFERENCE : 0.7 | IF (UNSTABLE PERIOD/CONCENTRATION PERIOD) ≦ 1.2<br>1.3 | 1.5 | IF (UNSTABLE PERIOD/CONCENTRATION PERIOD) ≦ 1.2<br>LARGE PERFORMANCE DIFFERENCE : 2.0<br>SMALL PERFORMANCE DIFFERENCE : 1.5<br>IF (UNSTABLE PERIOD)/(CONCENTRATION PERIOD) > 1.2<br>LARGE PERFORMANCE DIFFERENCE : 1.7<br>SMALL PERFORMANCE DIFFERENCE : 1.5 |
| INTERMEDIATE CONCENTRATION DEGREE | IF PERFORMANCE DIFFERENCE IS LARGE<br>0.5<br>IF PERFORMANCE DIFFERENCE IS SMALL<br>0.8 | — | — | IF PERFORMANCE DIFFERENCE IS LARGE<br>2.0<br>IF PERFORMANCE DIFFERENCE IS SMALL<br>1.5 |
| LOW CONCENTRATION DEGREE | IF PERFORMANCE DIFFERENCE IS LARGE<br>0.5<br>IF PERFORMANCE DIFFERENCE IS SMALL<br>0.8 | 0.8 | IF (UNSTABLE PERIOD)/(CONCENTRATION PERIOD) > 1.5<br>0.8 | IF PERFORMANCE DIFFERENCE IS LARGE<br>2.0<br>IF PERFORMANCE DIFFERENCE IS SMALL<br>1.5 |

F I G. 1 1

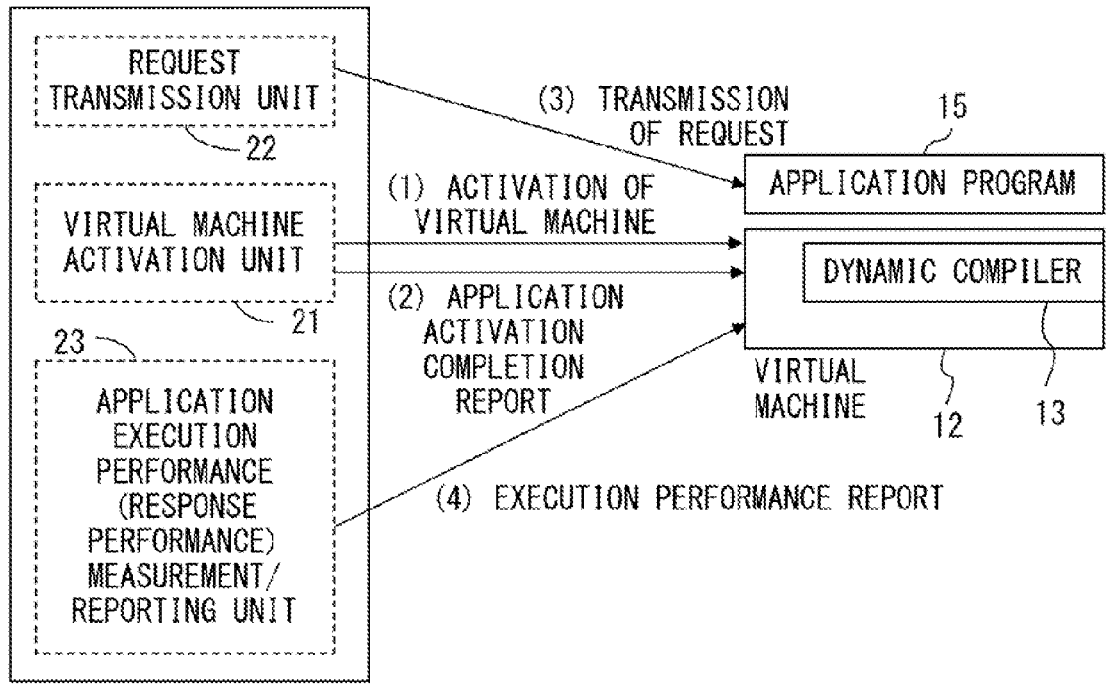
F I G. 1 3

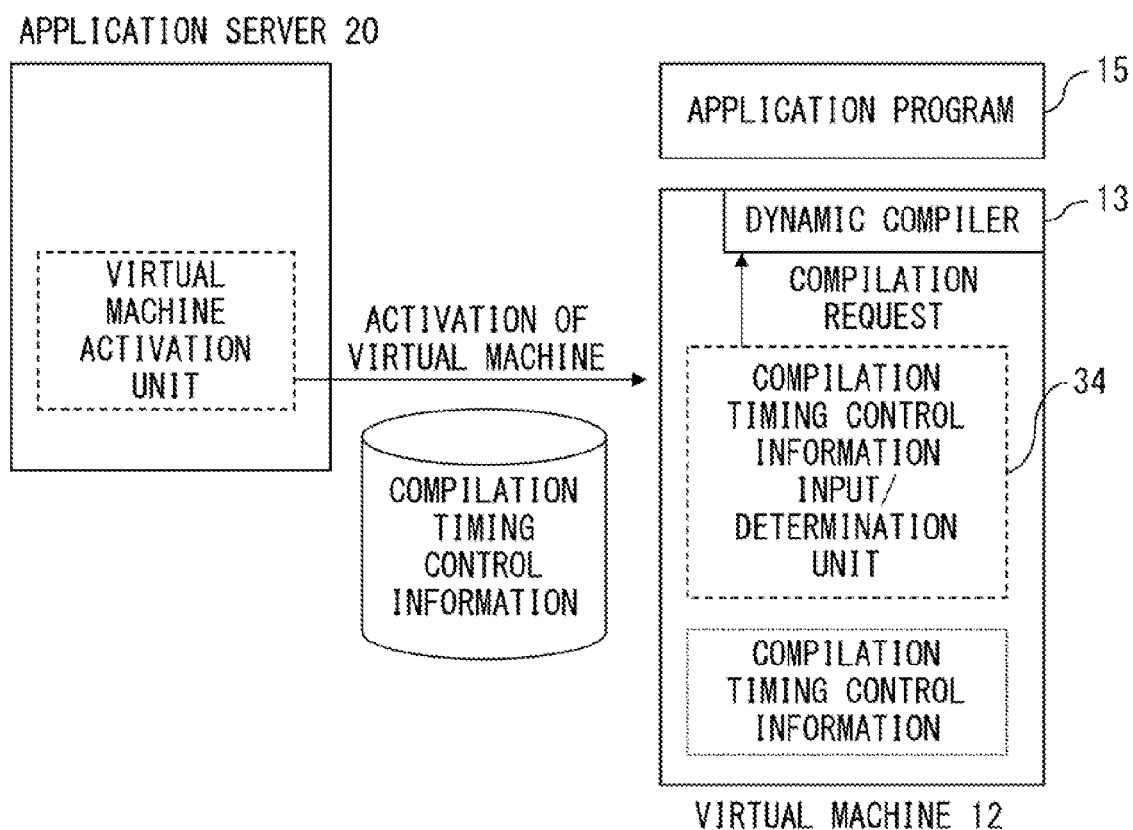
F I G. 1 5

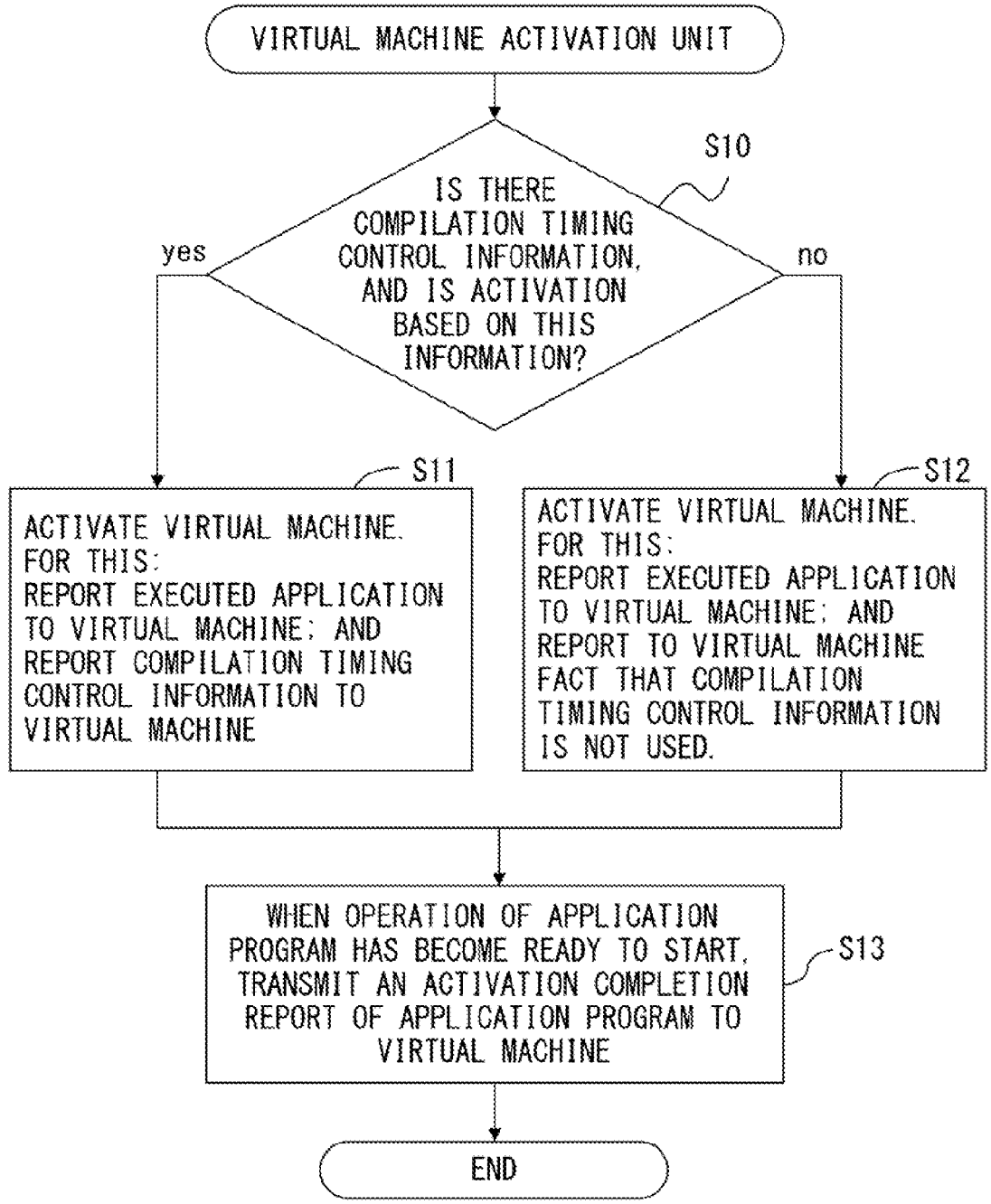
F I G. 16

RECORD OF AVERAGE EXECUTION PERFORMANCE (1)
| RECORD NUMBER OF AVERAGE EXECUTION PERFORMANCE | 1 | 2 | 3 | 4 | 5 | |
|---|---|---|---|---|---|---|
| AVERAGE EXECUTION PERFORMANCE (RESPONSE TIME) IN MILLISECONDS | 100 | 60 | 40 | 30 | 28 | |

(2) NUMBER OF TIMES OF RECODING AVERAGE EXECUTION PERFORMANCE (4)
- MAXIMUM NUMBER OF TIMES OF RECORDING AVERAGE EXECUTION PERFORMANCE
- CHANGE RATIO OF STABILITY DETERMINATION OF EXECUTION PERFORMANCE
- NUMBER OF TIMES OF SAMPLING EXECUTION PERFORMANCE DETERMINATION

EXECUTION PERFORMANCE INFORMATION REPORTED FROM APPLICATION SERVER (3)
- PERFORMANCE DIFFERENCE BETWEEN PERIODS BEFORE AND AFTER EXECUTION PERFORMANCE BECOMES STABLE
- PERIOD BEFORE EXECUTION PERFORMANCE BECOMES STABLE

(1) RECORD OF COMPILATION CONCENTRATION DEGREE

| RECORDING NUMBER OF COMPILATION CONCENTRATION DEGREE | 1 | 2 | 3 | 4 | 5 | ... | 10 | 11 |
|---|---|---|---|---|---|---|---|---|
| MEASUREMENT PERIOD (SECONDS) OF COMPILATION CONCENTRATION DEGREE | 5 | 10 | 15 | 20 | 25 | ... | 50 | 55 |
| CONCENTRATION DEGREE OF COMPILATION PROCESSES (NUMBER OF PROCESSES/SECOND) | 20 | 19 | 21 | 18 | 16 | ... | ... | ... |

(2)
| NUMBER OF TIMES OF RECORDING COMPILATION CONCENTRATION DEGREES |
| TOTAL NUMBER OF COMPILATION PROCESSES AT PREVIOUS MEASUREMENT |

(3) COMPILATION CONCENTRATION INFORMATION
| PERIOD WHEN COMPILATION PROCESSES CONCENTRATE |
| CONCENTRATION DEGREE OF COMPILATION PROCESSES (NUMBER OF PROCESSES/SECOND) |

(4)
| SAMPLING INTERVALS OF COMPILATION CONCENTRATION DEGREE MEASUREMENT |
| MINIMUM SAMPLING PERIOD OF COMPILATION CONCENTRATION DEGREE MEASUREMENT |
| MAXIMUM SAMPLING PERIOD OF COMPILATION CONCENTRATION DEGREE MEASUREMENT |
| CHANGE RATIO OF COMPILATION CONCENTRATION DEGREE DETERMINATION |

RECORD OF PROGRAM (METHOD) EXECUTION FREQUENCY

| PROGRAM (METHOD) IDENTIFICATION INFORMATION (METHOD NAME AND SIGNATURE) | EXECUTION FREQUENCY OF PROGRAM (METHOD) | COMPILATION STATUS |
|---|---|---|
| int method1(long) | 1032 | false |
| Void method2(char) | 25001 | true |
| char method3(int, long) | 10281 | true |
| ... | ... | ... |
| Void method551(int) | 732 | false |

F I G. 2 2

REFERENCE VALUE FOR DETERMINING IMPORTANCE OF PROGRAM (METHOD) EXECUTION FREQUENCY (1)

| PROGRAM (METHOD) EXECUTION FREQUENCY | IMPORTANCE |
|---|---|
| 30000 ≦ EXECUTION FREQUENCY | 1 |
| 10000 ≦ EXECUTION FREQUENCY < 30000 | 2 |
| 5000 ≦ EXECUTION FREQUENCY < 10000 | 3 |
| EXECUTION FREQUENCY < 5000 | 4 |

BELOW IS DETERMINATION REFERENCE INFORMATION FOR COMPILATION TIMING ADJUSTMENT

PROGRAM (METHOD) EXECUTION FREQUENCY INFORMATION AT ACTIVATION COMPLETION OF APPLICATION (2)

| PROGRAM (METHOD) IDENTIFICATION INFORMATION (METHOD NAME AND SIGNATURE) | EXECUTION FREQUENCY OF PROGRAM (METHOD) | COMPILATION STATUS |
|---|---|---|
| int method1(long) | 1032 | false |
| void method2(char) | 25001 | true |
| char method3(int, long) | 10281 | true |
| ... | ... | ... |
| void method551(int) | 732 | false |

PROGRAM (METHOD) EXECUTION FREQUENCY INFORMATION DURING PERIOD WITH STABLE APPLICATION EXECUTION PERFORMANCE (3)

| PROGRAM (METHOD) IDENTIFICATION INFORMATION (METHOD NAME AND SIGNATURE) | EXECUTION FREQUENCY OF PROGRAM (METHOD) | COMPILATION STATUS | IMPORTANCE |
|---|---|---|---|
| int method1(long) | 5692 | false | 3 |
| void method2(char) | 38021 | true | 1 |
| char method3(int, long) | 31420 | true | 1 |
| ... | ... | ... | ... |
| void method551(int) | 1732 | false | 4 |
| long method552() | 8366 | false | 3 |
| char method553(char, char) | 13602 | true | 2 |
| ... | | | |
| int method2672 | 512 | false | 4 |

COMPILATION CONCENTRATION INFORMATION
(GENERATED BY COMPILATION CONCENTRATION DEGREE MEASUREMENT UNIT)

(4)

| PERIOD WHEN COMPILATION PROCESSES CONCENTRATE |
|---|
| COMPILATION PROCESS CONCENTRATE DEGREE (THE NUMBER OF PROCESSES/SECOND) |

EXECUTION PERFORMANCE INFORMATION REPORTED FROM APPLICATION SERVER (5)

| PERFORMANCE DIFFERENCE OF EXECUTION PERFORMANCE BETWEEN PERIODS BEFORE AND AFTER EXECUTION PERFORMANCE BECOMES STABLE |
|---|
| PERIOD BEFORE EXECUTION PERFORMANCE BECOMES STABLE |

F I G. 2 4

(1)
| COMPILATION TIMING ADJUSTMENT COEFFICIENT |
| COMPILATION TIMING REFERENCE EXECUTION FREQUENCY |

(3) REFERENCE VALUE FOR CATEGORIZING PERFORMANCE DIFFERENCES INTO TWO LEVELS (LARGE OR SMALL)

| PERFORMANCE DIFFERENCE (PERFORMANCE DIFFERENCE BETWEEN BEFORE AND AFTER EXECUTION PERFORMANCE BECOMES STABLE) | LEVELS OF PERFORMANCE DIFFERENCE |
|---|---|
| PERFORMANCE DIFFERENCE > 2 | LARGE |
| PERFORMANCE DIFFERENCE ≤ 2 | SMALL |

(2) REFERENCE VALUE FOR COMPILATION CONCENTRATION DEGREE DETERMINATION

| NUMBER OF TIMES OF COMPILATION IN UNIT TIME | COMPILATION CONCENTRATION DEGREE |
|---|---|
| 40 ≤ NUMBER OF TIMES OF COMPILATION | 1 (HIGH CONCENTRATION DEGREE) |
| 10 ≤ NUMBER OF TIMES OF COMPILATION < 40 | 2 (INTERMEDIATE CONCENTRATION DEGREE) |
| NUMBER OF TIMES OF COMPILATION < 10 | 3 (LOW CONCENTRATION DEGREE) |

(4) DETERMINATION REFERENCE TABLE OF COMPILATION TIMING ADJUSTMENT COEFFICIENT

| IMPORTANCE / CONCENTRATION DEGREE | IMPORTANCE 1 (VERY IMPORTANT) | IMPORTANCE 2 (IMPORTANT) | IMPORTANCE 3 (ORDINARY) | IMPORTANCE 4 (NOT SO IMPORTANT) |
|---|---|---|---|---|
| HIGH CONCENTRATION DEGREE | IF COMPILATION CONCENTRATION PERIOD INFLUENCE RATIO ≤ 1.2 LARGE PERFORMANCE DIFFERENCE : 0.7 SMALL PERFORMANCE DIFFERENCE : 0.9 IF COMPILATION CONCENTRATION PERIOD INFLUENCE RATIO > 1.2 LARGE PERFORMANCE DIFFERENCE : 0.5 SMALL PERFORMANCE DIFFERENCE : 0.7 | IF COMPILATION CONCENTRATION PERIOD INFLUENCE RATIO ≤ 1.2 1.3 | 1.5 | IF COMPILATION CONCENTRATION PERIOD INFLUENCE RATIO ≤ 1.2 LARGE PERFORMANCE DIFFERENCE : 2.0 SMALL PERFORMANCE DIFFERENCE : 1.5 IF COMPILATION CONCENTRATION PERIOD INFLUENCE RATIO > 1.2 LARGE PERFORMANCE DIFFERENCE : 1.7 SMALL PERFORMANCE DIFFERENCE : 1.5 |

F I G. 2 6 A

| INTERMEDIATE CONCENTRATION DEGREE | IF PERFORMANCE DIFFERENCE IS LARGE 0.5 IF PERFORMANCE IS SMALL 0.8 | 1 | 1 | IF PERFORMANCE DIFFERENCE IS LARGE 2 IF PERFORMANCE IS SMALL 1.5 |
|---|---|---|---|---|
| LOW CONCENTRATION DEGREE | IF PERFORMANCE DIFFERENCE IS LARGE 0.5 IF PERFORMANCE IS SMALL 0.8 | 0.8 | IF COMPILATION CONCENTRATION PERIOD INFLUENCE RATIO > 1.5 0.8 | IF PERFORMANCE DIFFERENCE IS LARGE 2 IF PERFORMANCE IS SMALL 1.5 |

COMPILATION CONCENTRATION PERIOD INFLUENCE RATIO=(PERIOD BEFORE EXECUTION PERFORMANCE BECOMES STABLE)/(PERIOD WHEN COMPILATION PROCESSES CONCENTRATE)

COMPILATION TIMING CONTROL INFORMATION (GENERATION/OUTPUT)

(5)

| PROGRAM (METHOD) IDENTIFICATION INFORMATION (METHOD NAME AND SIGNATURE) | COMPILATION TIMING ADJUSTMENT VALUE |
|---|---|
| int method1 (long) | 928 |
| void method2 (char) | 25001 |
| ... | ... |
| char method553 (char, char) | 5000 |
| ... | |
| int method2672 | 20000 |

FIG. 26B

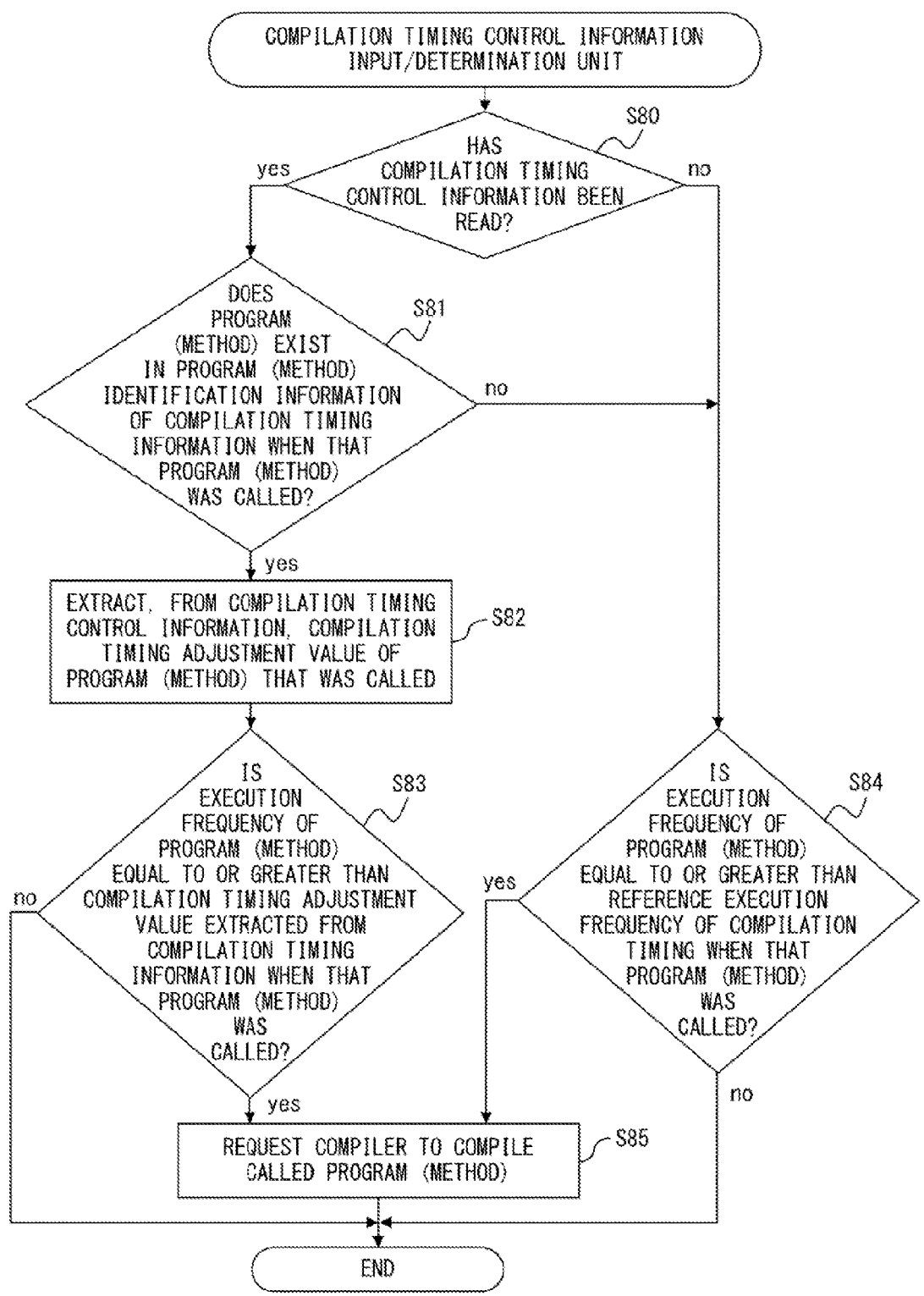
F I G. 2 7

(1) COMPILATION TIMING REFERENCE EXECUTION FREQUENCY

COMPILATION TIMING CONTROL INFORMATION (READING)

| IDENTIFICATION INFORMATION OF PROGRAM (METHOD) (METHOD NAME AND SIGNATURE) | COMPILATION TIMING ADJUSTMENT VALUE |
|---|---|
| int method1(long) | 928 |
| void method2(char) | 25001 |
| ... | ... |
| char method553(char, char) | 5000 |
| ... | |
| int method2672 | 20000 |

F I G. 2 8

| TOTAL NUMBER OF COMPILATION PROCESSES |

F I G. 29B

APPLICATION SERVER FOR OPTIMIZING TIMING OF PERFORMING DYNAMIC COMPILATION

CROSS-REFERENCE TO RELATED APPLICATION

This application is based upon and claims the benefit of priority of the prior Japanese Patent Application No. 2011-251127, filed on Nov. 16, 2011, the entire contents of which are incorporated herein by reference.

FIELD

The embodiments described herein are related to an application server that optimizes a timing of performing dynamic compilation in accordance with statuses of application execution performance.

BACKGROUND

Execution environments based on virtual machines are widely used for application programs such as Java or Microsoft .NET that receive programs through the Internet to execute them or that execute programs generated dynamically, after the application has started.

A reason for executing application programs in a virtual machine environment is that this method is appropriate for reading and executing programs after activating the applications (i.e., after the execution) or is appropriate for executing programs on various platforms (hardware or OSs (Operating Systems)) with the virtual machine absorbing platform-dependent processes. By contrast, application programs written in C language, COBOL, or the like are usually converted (compiled) by static compilers into an executable format, which is dependent on the operating platforms, before the execution of the applications.

As execution environments for executing an application program on a virtual machine, there are two methods. One is a method in which an application program is operated by an interpreter (commands in the program are interpreted and executed in a one-by-one manner), while the other is a method in which the program is compiled into native codes (machine instructions), and thereafter those codes are executed. Some execution environments have only one of these methods, while others have both of them.

Execution by interpreters is usually several through several hundred times slower than that by native codes, and programs are usually converted into native codes to be executed. However, conversion into native codes (compilation) is executed when an application program is executed, and thus the execution time of the application includes the time for the compilation process.

In particular, many compilation processes are executed immediately after the activation of an application program, causing a problem whereby the execution performance of the application program is not stable immediately after the activation. Compilation of an application program is executed after the activation (during execution) of the application program, and thus compilers for such compilation are referred to as dynamic compilers or just-in-time compilers.

There are techniques of reducing the influence of the use of dynamic compilers when application programs are executed on virtual machines, examples of which are as below.

The first technique is a method by which the degree of optimization by a dynamic compiler is lowered so as to reduce the loads of compilation processes. Optimization by a compiler is a process of converting output native codes into codes of a higher speed. Powerful optimization can increase the speed of native codes, while at the same time the compilation loads increase. Accordingly, when higher performance is required for activating application programs such as those in a virtual machine for clients, compilers with a light-loaded optimization process are used so as to give priority to performance during activation. By contrast, in an application-server oriented virtual machine, which has to execute many application programs, compilers with reinforced optimization processes are used so as to give priority to an ability to operate at full performance capacity.

For information about Java virtual machines used in the first conventional technique, or the like, refer to http://java-.sun.com/j2se/1.5.0/ja/docs/ja/guide/vm/index.html.

The second technique is a method in which adjustment is performed in such a manner that operations at full performance capacity can be achieved while suppressing loads of compilation processes for activation. Compilers based on this method are referred to as adaptive compilers. This type of compiler employs a method in which execution starts as an interpreter at the activation of an application program, and bottlenecks (methods that operate often) for performance are found by analyzing the program during the execution. Methods that may have an influence on performance are compiled while methods that are executed less frequently are not compiled so as to achieve the maximum performance while reducing loads of compilation processes at the activation of application programs.

For information about Java virtual machines used in the second conventional technique, refer to the above web site.

For information about the outline of optimization and compilation of Oracle, JRockit, JDK, and JIT, please refer to http://otndnld.oracle.co.jp/document/products/jrockit/gen-info/diagnos/underst_jit.html.

As a third technique, there is a method in which programs that are frequently used are read and compiled in accordance with information obtained beforehand (obtained, for example, at the previous execution of the application program) after the application program is activated and before inputs into that application program are received (i.e., before starting the service).

As a conventional technique, there is a system that makes it possible to start a process of converting highly frequent methods into native codes in a short time and at the same time to prevent interference in the execution of application programs that might be caused by loads of this conversion.

Patent Document 1: Japanese Laid-open Patent Publication No. 2007-213490

As described above, in an environment of executing application programs on virtual machines, application programs are usually executed after the programs are converted into native codes after the activation of the application programs, by compilers that are referred to as a dynamic compiler or a just-in-time compiler.

Conversion into native codes (compilation) is performed during the execution of application programs, bringing about an inevitable problem wherein the execution time of an application program includes time for compilation.

In particular, there is a problem wherein many compilation processes operate immediately after the activation of an application, causing unstable execution performance of applications immediately after the activation.

FIG. 1 illustrates an example of unstable execution performance immediately after the activation.

The horizontal axis represents a time that has elapsed after the activation of a virtual machine, the right horizontal axis represents a time that an application program requires to process a process request (response time), and the left horizontal axis represents the total number of programs (methods) converted by compilers into native codes. Because not all programs have been converted into native codes (some of the programs are executed by interpreters) and many compilation processes are executed, the processing times are not stable.

In order to cope with this problem, the first conventional technique employs a method in which the degree of optimization by compilers is sacrificed so as to reduce loads of compilation processes. This method is effective in a particular environment such as a client machine. However, because of weakness in optimization by compilers, this method sacrifices the maximum performance of application programs in an environment using a virtual machine for an application server, which is required to operate at the maximum performance capacity. For example, this method is not appropriate for an application program operating on an application server that starts its service at nine o'clock every morning in order to perform a large number of processes from immediately after the activation (online ticket sales for example).

The second technique employs a method in which only highly frequent methods, which become a bottleneck, are compiled. This method is effective in view of performance at the activation of applications compared with a method in which all programs are compiled. However, how many minutes to use for execution by interpreters and an analysis of execution frequencies of programs, and when to execute a compilation process so as to shift to execution based on native codes in order to achieve desired effects depend upon various factors (such as the hardware performance, characteristics of application programs, the amount of processes performed by application programs, etc.). As a method of finding a bottleneck in a program (methods executed highly frequently), a method is known that uses the number of times of calling programs (methods) or the number of loops of programs (methods). However, finding the optimum balance between execution by an interpreter and native-code based execution is very difficult, and a method has conventionally been employed in which balance adjustment is not performed but compilation is performed when the number of times of execution of a program (method) has reached a prescribed number of times. Accordingly, in some cases, the operation requirements are not satisfied by the performance at the activation of an application program even when a virtual machine supported by the second conventional technique is used.

The third conventional technique employs a method in which programs (methods) that are frequently used are read and compiled after the activation of the application and before reception of input into the application program (i.e., before starting services). However, this method is not appropriate to applications that require reading of programs through the Internet during the execution of the application programs or to applications that generate programs after the execution.

In a case where programs are to be read dynamically (read on an as-needed basis) such as a case of Java language, when a method refers to another method and the method to be referred to is still being read, the compiler generates redundant codes.

This is because a code instructing that "if the program has not been read, the program should be read and the reference should be resolved" has to be included in codes generated by compilers. These kinds of codes are often used in the third technique, and accordingly this technique is not appropriate to applications that require reading of programs through the Internet during the execution of the application programs or to applications that generate programs after the execution.

Also, this technique is disadvantageous in view of optimization by compilers. Compilers can perform more powerful optimization by predicting the execution of programs (branching probability by IF statements, and functions called frequently by virtual function call, for example). When programs are read and executed dynamically, dynamic information of programs is collected (profiled) during the execution by an interpreter before compilation, and the optimization by the compiler usually uses this information. However, this optimization cannot be performed if compilation is performed before the execution of programs as in the third conventional technique, and thus this technique is disadvantageous.

SUMMARY

An application server according to an aspect of embodiments described below is an application server that performs dynamic compilation for executing a program, including an execution performance information obtainment unit to obtain information on execution performance of a program when the program is executed by an interpreter, a compilation timing information setting unit to set information specifying compilation timing for each method included in the program in accordance with the information on the execution performance, and a dynamic compilation unit to compile the method into a native code in accordance with the information specifying the compilation timing.

According to the embodiments described below, it is possible to provide an application server that adjusts a timing of dynamic compilation in accordance with statuses of application execution performance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of unstable execution performance of an application program immediately after the activation;

FIG. 4 illustrates how the statuses of the compilation processes illustrated in FIG. 3 change when dynamic compilation according to the present invention is applied;

FIG. 8 is a graph (fourth) for explaining the tendency of the execution performance and the compilation process amount of an application program;

FIG. 10 explains how to adjust a timing of compilation on the basis of determination reference information for compilation timing adjustment (first);

FIG. 11 explains how to adjust a timing of compilation on the basis of determination reference information for compilation timing adjustment (second);

FIG. 13 illustrates block configurations of respective functions that operate on an application server;

FIG. 15 illustrates operations on a virtual machine and operations by a dynamic compiler of a virtual machine (second);

FIG. 16 is an operation flowchart of a virtual machine activation unit;

FIG. 18 illustrates data used by the application execution performance measurement/reporting unit;

FIG. 20 illustrates data used by the compilation concentration degree measurement unit;

FIG. 22 illustrates data used by the program (method) execution frequency measurement unit;

FIG. 24 illustrates data used by the compilation timing adjustment determination unit;

FIGS. 26A and 26B illustrate data used by the compilation timing control information calculation/output unit;

FIG. 27 is an operation flowchart of a compilation timing control information input/determination unit;

FIG. 28 illustrates data used by the compilation timing control information input/determination unit;

FIGS. 29A and 29B illustrate an operation flowchart of a dynamic compilation unit, and data used by the dynamic compilation unit;

DESCRIPTION OF EMBODIMENTS

Figure 2:
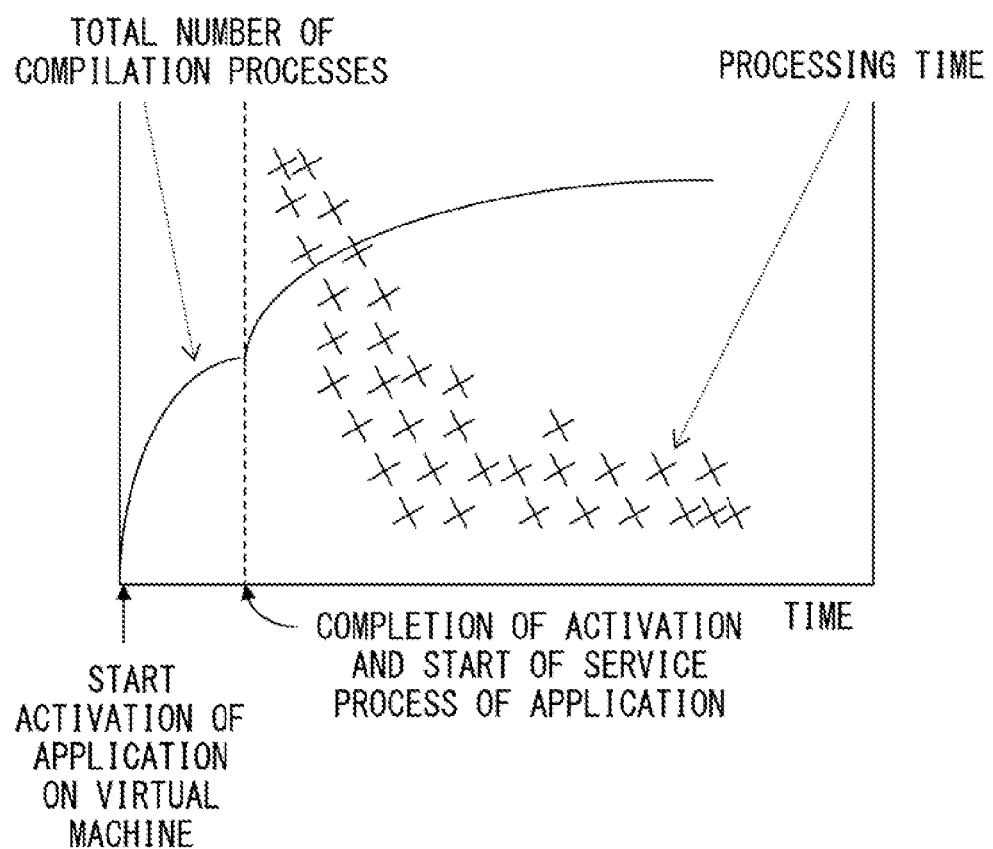
FIG. 2 illustrates an example where the execution performance of an application program is unstable immediately after the activation under an environment in which a virtual machine operates on an application server.

According to the present embodiment, timing of compilation is adjusted so as to avoid a situation where many compilation processes operate for the activation of an application program, reducing the CPU time that can otherwise be used for the execution of the application program (overhead), and thereby the balance of execution by interpreters and execution based on native codes is optimized (it is determined whether to delay or expedite the timing of compiling each program in order to enhance the execution performance of the application program) in order to stabilize the execution performance during a period immediately after the activation of the application program.

The above object can be achieved by the two methods below.

(1) A compilation process amount is reduced during a period when performance is not stable immediately after the activation of application programs.

(2) At the same time, regarding programs (methods) having a great influence on the execution performance, the timing of compilation is expedited so as to shift from interpreter execution to native-code based execution earlier even during a period immediately after the activation with unstable performance while programs (methods) having a smaller influence on the execution performance are not compiled during a period immediately after the activation when compilation processes concentrate, making the performance unstable.

In other words, compilation processes immediately after the activation of an application program is distributed, and programs (methods) having a great influence on the execution performance are compiled at an appropriate timing. Note that units of programs being compiled may be methods, and compilation of programs include compilation of methods in the explanations below.

Also, it is assumed that virtual machines operate on application servers. Application servers activate virtual machines so as to start the activation of application programs on the virtual machines. When preparation for performing services based on the application programs is completed, the activation of the application programs is completed. In other words, application programs do not start their services before the completion of the activation of the application programs (A situation where execution of an application program on an application server is enabled is sometimes referred to as completion of the activation of an application server).

Programs (methods) that have begun to be executed before the completion of the activation of the application programs are not compiled after the start of services because the compilation of these programs (methods) is completed before the completion of the activation of the application programs. Thereby, the number of methods to be compiled after the start of services is reduced, realizing (1).

According to conventional techniques, programs (methods) that have started to be executed before the completion of the activation of an application were sometimes compiled after the start of services. Also, the timing of compiling programs (methods) that are executed after the activation of application programs are adjusted (expedited or delayed) in accordance with statuses of loads of compilation processes and a degree of influence on the execution performance of the application programs, and thereby (2) can be realized.

FIG. 2 illustrates an example where the execution performance of an application program is unstable immediately after the activation under an environment in which a virtual machine operates on an application server.

When an application program has started the activation, execution of programs (methods) necessary for the activation begins, and many compilation processes are executed on these programs (methods), and the compilation process amount is reduced temporarily around the time when the activation is completed. When services start, programs (methods) for executing such services are operated, and thus many compilation processes are executed on these programs (methods).

In the above situation, programs (methods) that have already started to be executed are sometimes compiled at this timing, i.e., before the completion of the activation of an application program. When service processes have been advanced to a particular extent, many programs (methods) shift to native-code based execution, and the number of compilation processes is reduced, making service process time (response time) stable.

Although the activation of an application program is completed and services start at the same time in FIG. 2, these events may occur at slightly different points in time depending upon the operation speed of the application program in practice. However, these events are assumed to occur at the same time in FIG. 2 for convenience.

Figure 3:
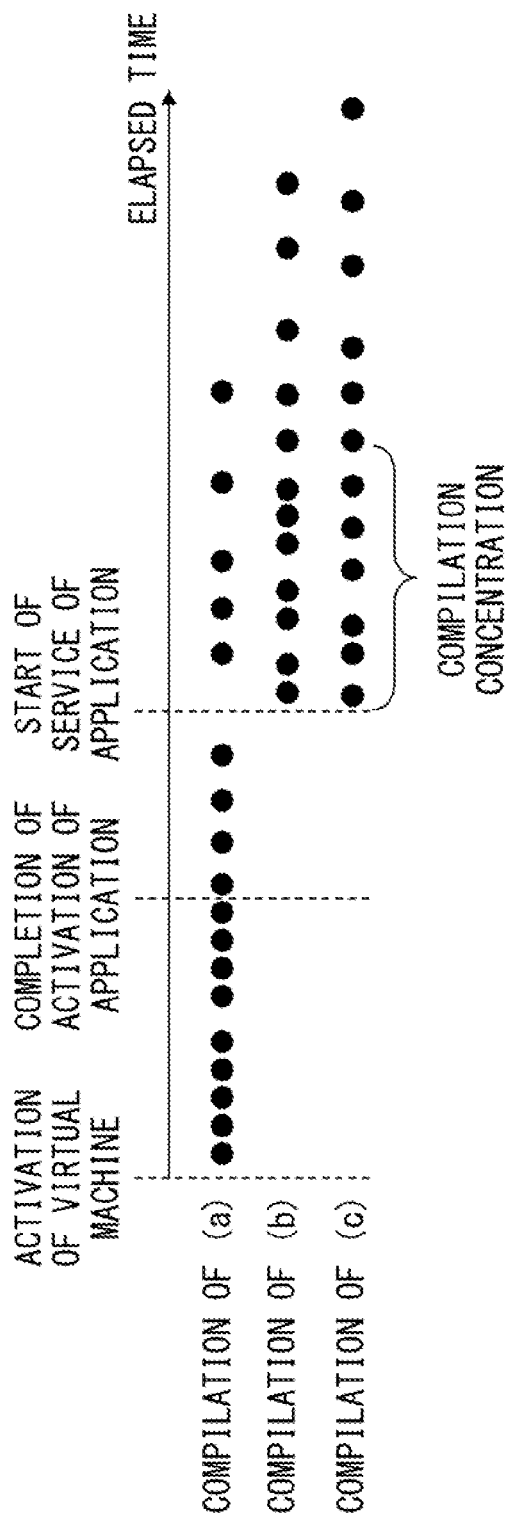
FIG. 3 illustrates an image of a situation regarding compilation processes (a compilation process amount and a timing of occurrences of compilation) for each characteristic of programs (methods) in relation to the execution of the application program illustrated in the example in FIG. 2.

FIG. 3 illustrates an image of a situation about compilation processes (compilation process amount and timing of occurrences of compilation) for each characteristic of programs (methods) in relation to the execution of the application illustrated in the example in FIG. 2.

Each black circle represents a compilation of a program (method), and the occurrence of compilation processes is illustrated for three different characteristics, ((a), (b), and (c)), of compilation of a program (method).

(a) represents "compilation of a program (method) that has been executed at least once at the point of completion of the activation of an application program". (b) represents "compilation of a program (method) that is to be executed after the application program has begun its service and that has a great influence on the execution performance". (c) represents "compilation of a program (method) that is to be executed after the application program has begun its service and that has a small influence on the execution performance".

Compilation processes concentrate in a period immediately after the application program has started its services, and execution by an interpreter gradually shifts to execution based on native codes during this period.

FIG. 4 illustrates how the statuses of the compilation processes illustrated in FIG. 3 change when compilation according to the present invention is applied.

A program (method) that has been executed at least once at the completion of the activation of an application program of (a) is compiled before the completion of the activation of the application program, and thereby the compilation is completed before the start of services. This has moderated the concentration of compilation processes during a period during which performance immediately after the activation is unstable. A program (method) that is to be executed after the application program of (b) has started its services and that has a great influence on the execution performance is compiled at a timing earlier than conventional techniques, and thereby a high-speed shift from interpreter-based execution to native-code based execution is achieved. A program (method) that is to be executed after the application program of (c) has started its services and that has a small influence on the execution performance is compiled later than the conventional techniques, and thereby concentration of compilation processes during a period immediately after the activation when the performance is unstable is moderated.

In this method, black circles represent compilation of a program (method). Also, similarly to FIG. 3, (1) represents compilation of a program (method) that has been executed at least once at the completion of the application. (b) represents compilation of a program (method) that is to be executed after the application has started the services and that has a great influence on the execution performance. (c) represents a program (method) that is to be executed after the application has started the services and that has a small influence on the execution performance.

Timing of compilation of programs (methods) (b) and (c) that are to be executed after the completion of the activation of applications is adjusted by expediting or delaying compilation timing in accordance with the degree of influence on the execution performance. Further, the adjustment has to be supported by comprehensive determination that takes into consideration not only characteristics of each program (method), but also the execution performance of application programs, the general tendency of a compilation process amount, and the actual situation.

For example, when a program (method) has a great influence on the execution performance to some extent, it is desirable to compile this program earlier. However, in an application program involving a large amount of compilation processes, the above adjustment increases the loads of compilation processes, causing a possibility of reducing the execution performance.

In order to explain what kind of comprehensive determination should be made in such a case, explanations will be given for the key cases of execution performance tendencies and tendencies of compilation process amounts of an application program.

FIGS. 5 through 8 explain tendencies and categories of execution performance and compilation process amounts of an application program.

Figure 5:
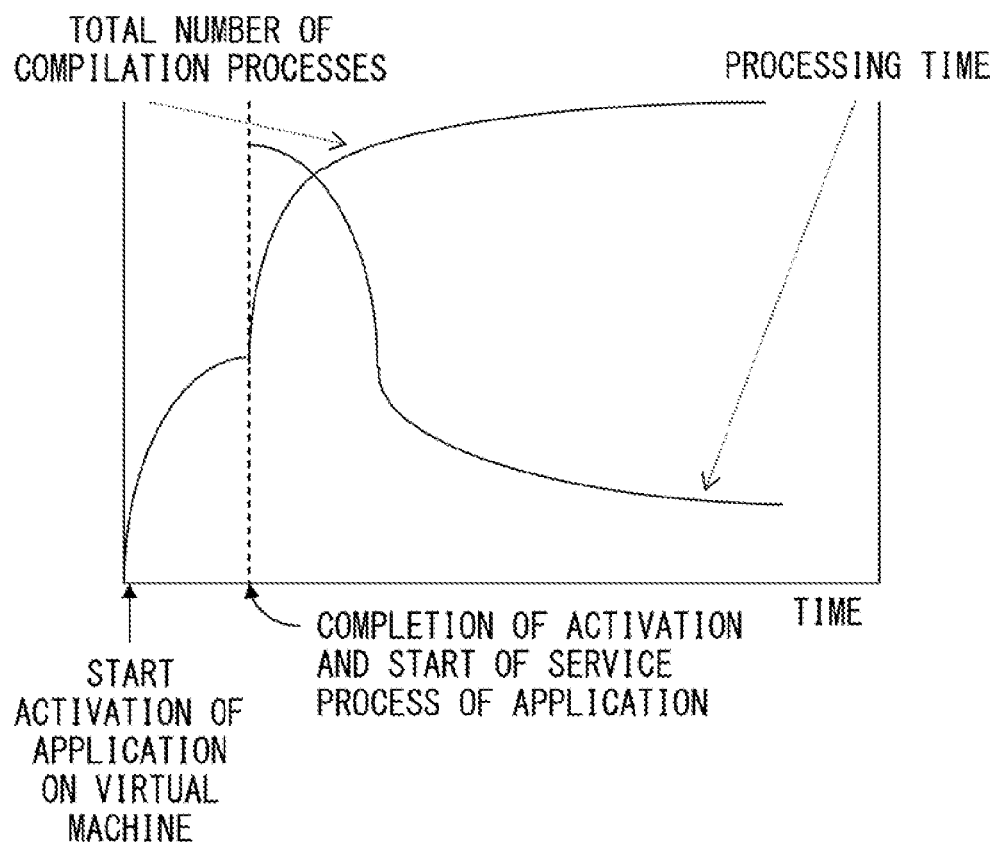
FIG. 5 is a graph (first) for explaining the tendency of the execution performance and the compilation process amount of an application program.
Figure 6:
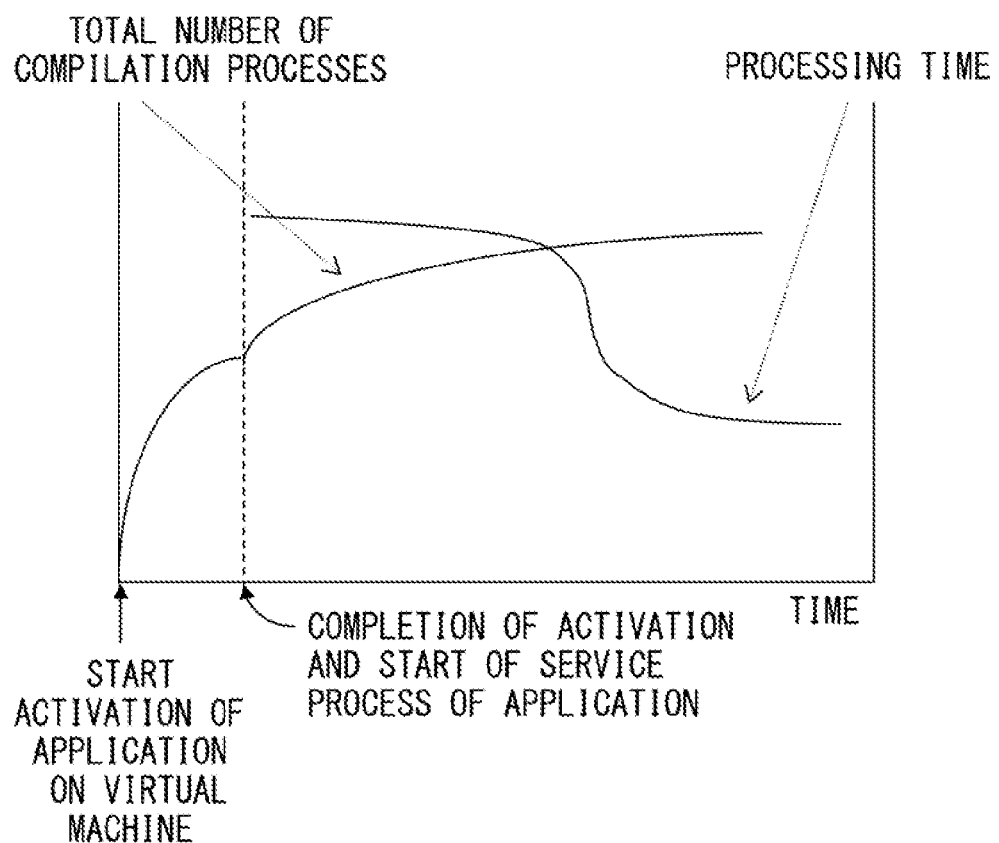
FIG. 6 is a graph (second) for explaining the tendency of the execution performance and the compilation process amount of an application program.
Figure 7:
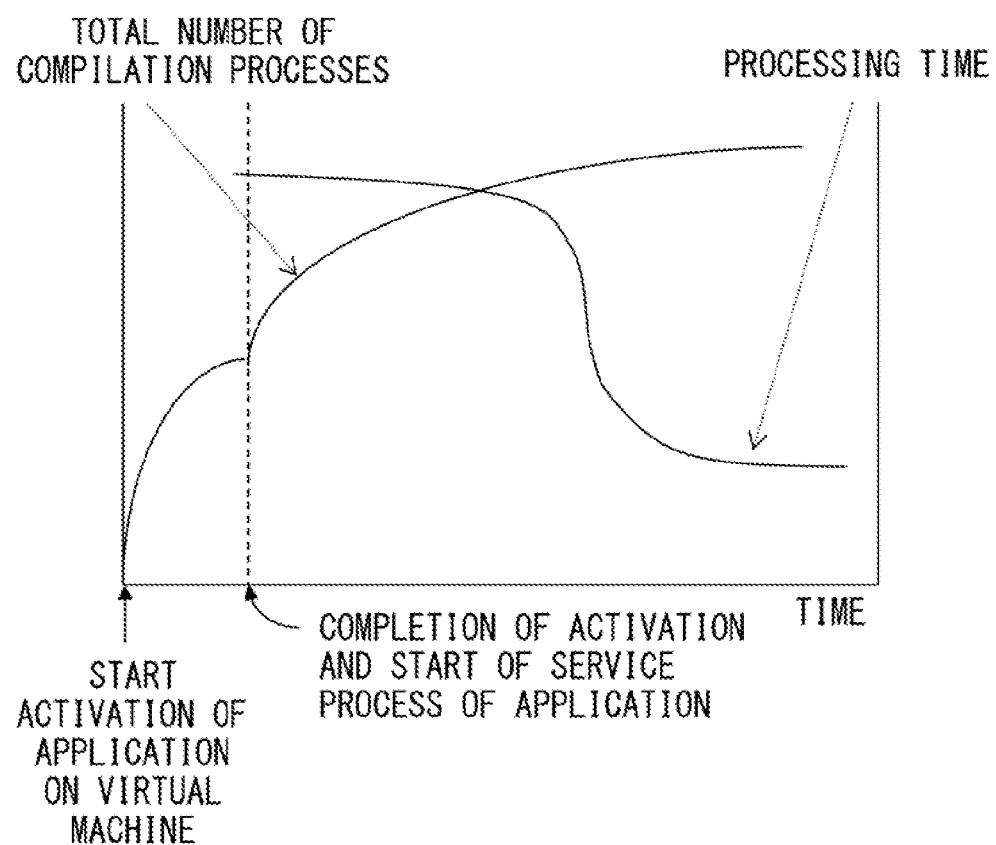
FIG. 7 is a graph (third) for explaining the tendency of the execution performance and the compilation process amount of an application program.

In FIGS. 5 through 7, the horizontal axis represents time, the right vertical axis represents processing time, and the left vertical axis represents the number of times of compilation.

Case 1 illustrated in FIG. 5 is a case where: (1) the compilation process amount has increased abruptly immediately after the start of service processes (operation) of an application program; (2) there is a large difference in performance (difference between processing times (response times)) between the execution performance immediately after the start of service processes (processing time) and execution performance during a stable period (processing time); and (3) a period when the execution performance (processing time) is unstable is short.

In such a case, compilation processes concentrate during a short period immediately after the start of service processes (immediately after the operation), leading to a large decrease in the execution performance during this period, while execution by an interpreter shifts earlier to execution based on native codes as a whole, leading to a shorter period when execution performance is not stable.

Case 2 illustrated in FIG. 6 is a case where: (1) Compilation processes have advanced gradually after the start of application operation; (2) the performance difference of execution performance between a period immediately after the activation and a stable period is smaller than that in case 1 illustrated in FIG. 5; and (3) a period with unstable execution performance is long.

In such a case, compilation processes do not increase abruptly immediately after the start of operations, and accordingly a shift from execution by an interpreter to execution based on native codes is made gradually despite the fact that compilation processes have a smaller influence on the execution performance, thereby a period before the execution performance becomes stable is long.

Case 3 illustrated in FIG. 7 is a case where the performance difference of execution performance is large between execution performance immediately after the start of operations and execution performance in a stable period, and a period before the execution performance becomes stable is long. Although this pattern is exceptional, there is a possibility that this pattern appears because the performance difference is large between execution by an interpreter and execution based on native codes (case 2 in FIG. 6 corresponds to this explanation; however, the performance difference is large between a stable period and an unstable period), because a period when many compilation processes are performed is long (case 1 in FIG. 5 corresponds to this explanation, however, many compilation processes are performed successively), or because the above two situations have a complex influence.

When the above three cases are considered in view of phenomena that have actually occurred, they can be categorized by levels of performance differences between a period before execution performance becomes stable and a period after it has become stable, and by the lengths of the unstable periods, i.e., can be categorized by a table illustrated in FIG. 8. Also, factors causing these phenomena include three factors, whether or not programs (methods) having a great influence on execution performance have been shifted to native-code based execution, the degree of concentration of compilation processes, and a period during which compilation processes concentrate. Appropriate timing adjustment can be performed for compilation by adjusting these factors in accordance with the types of these cases above.

Information serving as determination references for adjusting the timing of compilation is: (1) performance difference between periods before and after execution performance has become stable; (2) period before execution performance has become stable; (3) degree of concentration of compilation processes; (4) period when compilation processes concentrate; and (5) execution frequency for each program (method) (or importance). In the present embodiment, timing of compilation is adjusted in accordance with these factors.

These five pieces of information are referred to as determination reference information for compilation timing adjustment.

Figure 9:
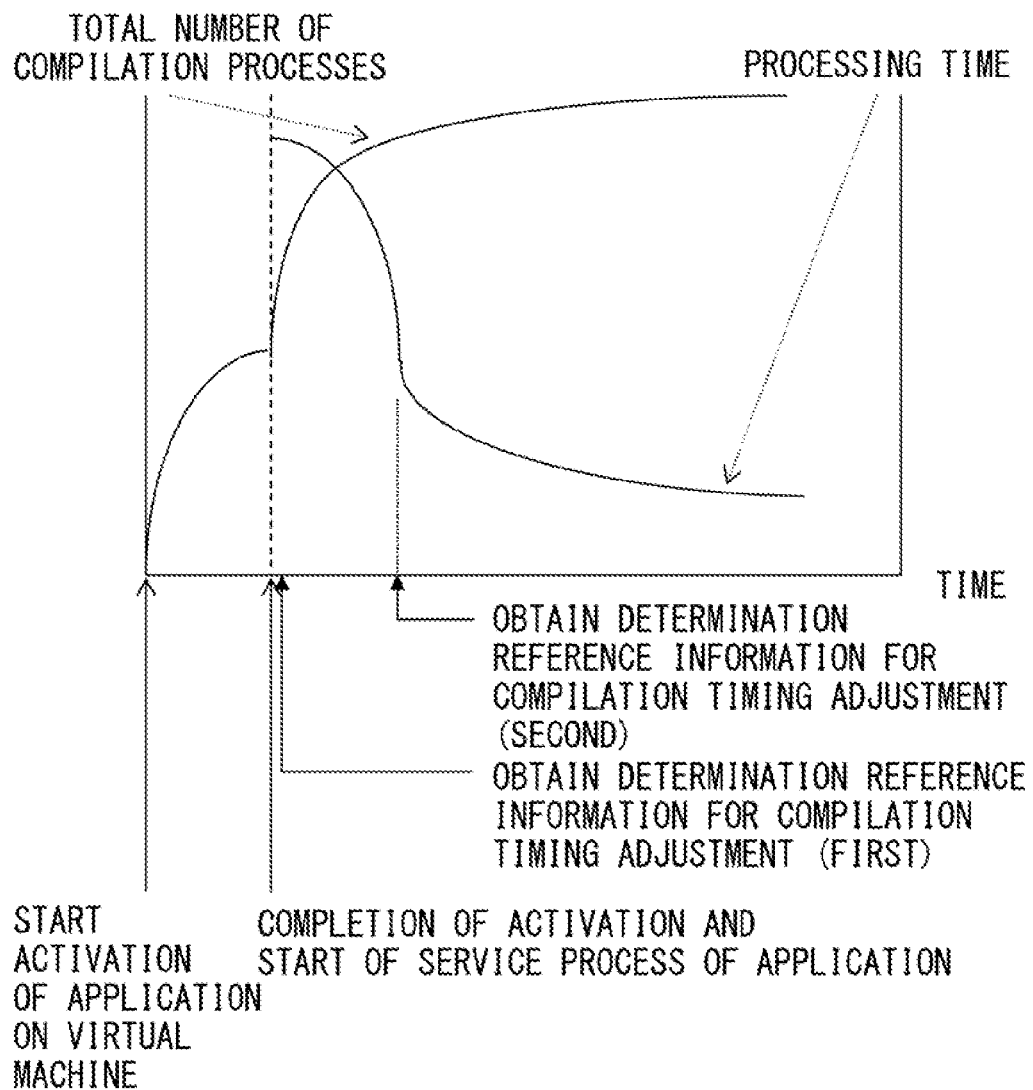
FIG. 9 illustrates two timings for obtaining determination reference information for compilation timing adjustment.

FIG. 9 illustrates two timings for obtaining determination reference information for compilation timing adjustment.

In order to perform adjustment in accordance with characteristics (a), (b), and (c) in FIGS. 3 and 4, an execution frequency for each program (method) (importance) is obtained two times, i.e., at a point when the activation of an application program is completed, and a point when the performance has become stable after the operation of the application program has begun.

When it is not possible to distinguish when the performance became stable after the operation of an application program has started, the information may be obtained when a prescribed measurement period has elapsed or when the degree of concentration of compilation processes changed.

Determination reference information for compilation timing adjustment can be obtained only after the execution of the application program (the information cannot be obtained unless the application program is executed). Accordingly, an application program is operated for a testing session before operating the application program under the same environment as the operation environment so as to obtain the determination reference information, determine the timing of compiling each program (method), and generate information for adjusting the timing of compilation.

Information for adjusting compilation timing may be generated not only in a testing session before operations, but also in the first operation of the application program or in an arbitrary operation when it is necessary. Once the generation has succeeded, the generated information can be used in subsequent operations. Among determination reference information for compilation timing adjustment, (1) performance difference of execution performance in periods before and after the performance has become stable and (2) a period before the execution performance becomes stable are obtained by the application server so as to report the information to a virtual machine, while (3) concentration degree of compilation processes, (4) a period when compilation processes concentrate, and (5) execution frequency (importance) of each program (method) are obtained by a virtual machine.

Figure 17:
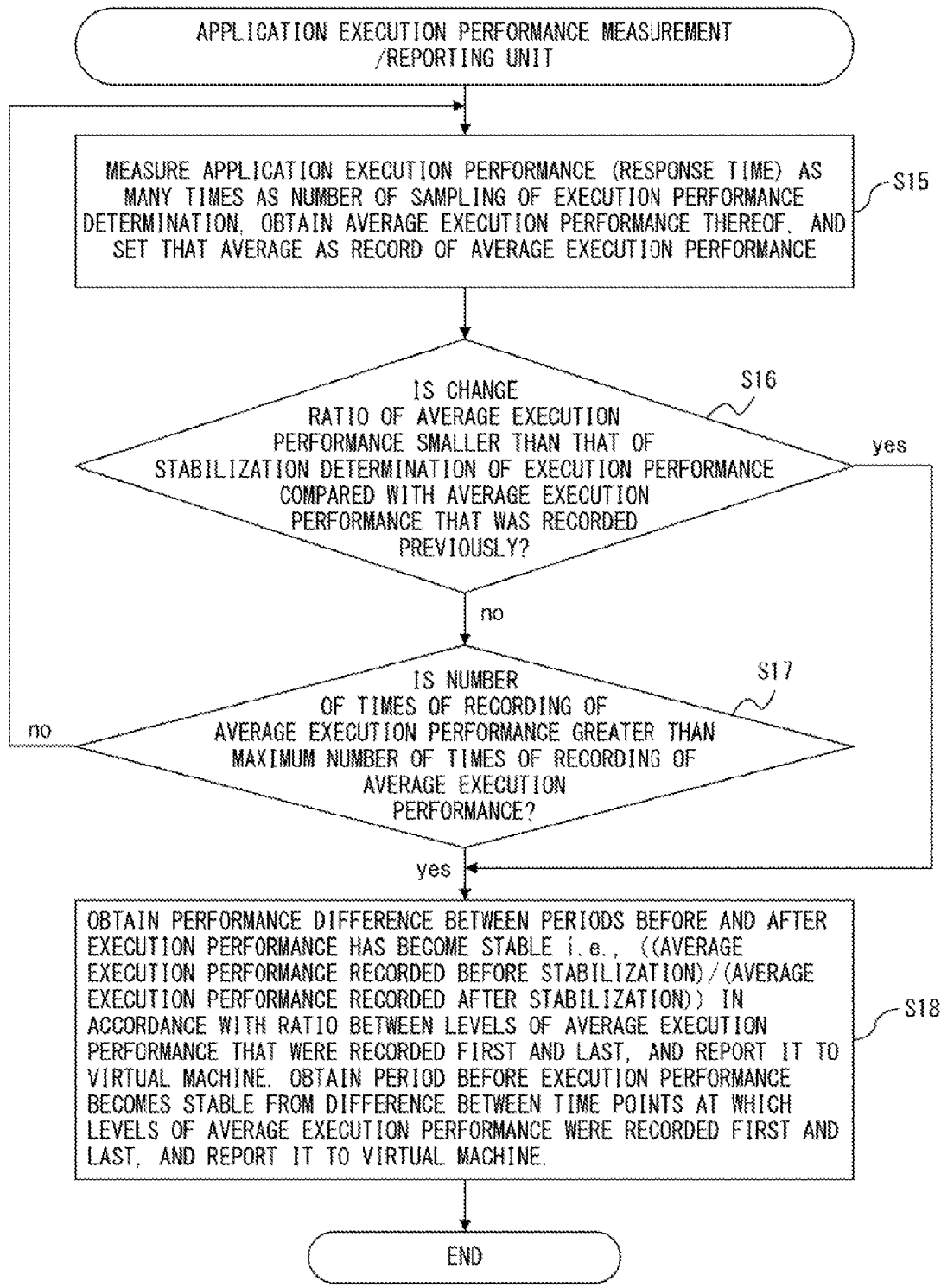
FIG. 17 is an operation flowchart of an application program execution performance measurement/reporting unit.

The performance difference between periods before and after the execution performance has become stable as denoted by (1) is obtained by obtaining the performance difference (difference in response time) on the assumption that the time point at the activation of an application program is before stabilization and that the time point at which fluctuations of the number of methods processed by a compiler has become equal to or less than a prescribed value is after stabilization (corresponding to steps S16 and S18 in FIG. 17, which will be described later). The period before stabilization as denoted by (2) is a period between (1) the period before stabilization and the period after the stabilization. (3) compilation concentration is the number of compiling processes executed in a certain measurement period. The period when compilation processes concentrate as denoted by (4) is a period during which the degree of concentration of compilation processes are measured. The execution frequency (importance) of each program (method) as denoted by (5) is obtained by counting the number of times of execution per unit of time for each method, and categorizing the methods by using a threshold based on the counted number.

When an application program is executed on an application server, the writer (system engineer for example) of the application program and the user (operator) are often the same person.

When the writer and the user of an application program are the same person, whether the collection of determination reference information for compilation timing adjustment is performed in a testing session or during operations of the application program is determined by that person.

When an application program is provided as a product to a third person (user), it is possible to employ a form in which a compilation timing adjustment value is determined in a testing session in accordance with a general utilization form, and the determined value is included in the package of that product (it is also possible to include in the product a system to determine and use a compilation timing adjustment value).

FIGS. 10 and 11 explain how to adjust compilation timing on the basis of the determination reference information for compilation timing adjustment.

Timing of compilation is determined by the level that the execution frequency of a program (method) has reached. In the present embodiment, timing of compilation is adjusted for each program (method) in accordance with the level that the execution frequency has reached.

According to conventional techniques, the number of executions of methods is counted, and the methods are compiled when the counted number has reached a prescribed threshold. All methods are compiled when the number of times of execution has reached a fixed threshold.

According to the present embodiment, a method having characteristic (a) performs adjustment in such a manner that compilation is completed before the activation of an application program is completed.

Methods having characteristics (b) and (c) determine a timing of compilation on the basis of a compilation timing adjustment value obtained from the determination reference information for compilation adjustment ((1) performance difference between periods before and after execution performance has become stable, (2) period before the execution performance has become stable, (3) degree of concentration of compilation processes, (4) period during which compilation processes concentrate, and (5) execution frequency (importance) of each program (method)).

A program (method) with characteristic (a) performs adjustment in such a manner that compilation is completed before the activation of an application program is completed. By referring to an execution frequency for each program (method) that was measured when the activation of an application program is completed, a program (method) is compiled slightly earlier than a compilation timing defined by the execution frequency at the completion of the activation of the application program (when an execution frequency that has been estimated to be smaller by a prescribed specific ratio is reached). Thereby, programs (methods) that were executed before the completion of the activation of an application program are not compiled after the start of operations of the application program.

Explanations will be given for a way of adjusting a compilation timing of a program (method) with characteristics (b) and (c). As for an execution frequency (importance) of each program (method), which is one piece of determination reference information for compilation timing adjustment, it is assumed that the higher an execution frequency is, the greater the influence of the execution frequency is on the execution performance of the application program. Further, the execution frequencies are categorized as IMPORTANCE DEGREE 1 (very important), IMPORTANCE DEGREE 2 (important), IMPORTANCE DEGREE 3 (ordinary), and IMPORTANCE DEGREE 4 (low importance). Also, the degrees of concentration of compilation processes are categorized in accordance with the degrees of concentration i.e., into a high concentration degree, an intermediate concentration degree, and a low concentration degree. A fundamental decision about whether a timing of a compilation is to be expedited or delayed is made in accordance with the concentration and importance of each program (method). In addition to this, actual operation statuses of the application program, i.e., the performance difference between periods before and after the execution performance has become stable, the period before the execution performance has become stable, and the period when compilation processes concentrate in determination reference information for compilation timing adjustment are used for optimization, and the timing of performing compilation is determined.

FIG. 10 illustrates the principle of how to adjust a timing of compilation on the basis of determination reference information for compilation adjustment for programs (methods) with characteristics (b) and (c). FIG. 11 illustrates degrees of adjustment in terms of numbers.

The coefficients for adjustment illustrated in FIG. 11 indicate that compilation is performed when the number of times of execution of a program (method) has reached the value obtained by multiplying each of the coefficients by a compilation timing reference execution frequency (a reference execution frequency of compilation timing, which is a prescribed value). The values of these coefficients are prescribed at the activation of a virtual machine, or are set appropriately by a program writer or user.

As explained in the above adjustment method, a program (method) of characteristic (a) is compiled in accordance with the level that the execution frequency of the program (method) has reached.

In FIG. 10, each method is categorized in accordance with its importance. Importance is determined by comparing the execution frequency of a method with three different thresholds (threshold 1>threshold 2>threshold 3). Methods with the highest execution frequency, those that are greater than threshold 1, are categorized into IMPORTANCE DEGREE 1. Methods with an execution frequency smaller than threshold 1 but greater than threshold 2 are categorized into IMPORTANCE DEGREE 2. Methods with an execution frequency smaller than threshold 2 but greater than threshold 3 are categorized into IMPORTANCE DEGREE 3. Methods with an execution frequency smaller than IMPORTANCE DEGREE 3 are categorized into IMPORTANCE DEGREE 4. There are two thresholds for concentration degrees so that the values of concentration degrees of compilation processes are categorized.

Methods with IMPORTANCE DEGREE 1 are executed highly frequently, and accordingly a timing of compilation of these methods is expedited regardless of whether the concentration degree is high, intermediate, or low. In particular, setting is performed so that the greater the performance difference is between periods before and after the execution performance has become stable, earlier the compilation timing. Compilation of methods with IMPORTANCE DEGREE 2 is delayed when the concentration degree is high and a period before the execution performance becomes stable coincides with a period when compilation processes concentrate. When the concentration degree is intermediate, nothing is performed. When the concentration degree is low, compilation timing is expedited.

Compilation timing of methods with IMPORTANCE DEGREE 3 is delayed when the concentration degree is high. When the concentration degree is intermediate, nothing is performed, while when the concentration degree is low, the compilation timing is expedited if the period before the execution performance becomes stable is longer than the period when the compilation processes concentrate. Compilation timing of methods with IMPORTANCE DEGREE 4 is delayed regardless of levels of concentration degrees. In particular, the greater the performance difference is between the periods before and after the execution performance becomes stable, the more the timing is delayed. However, when the concentration degree is high, the timing is delayed slightly if the period before the execution performance becomes stable is longer than the period when the compilation processes concentrate.

FIG. 11 is a specific example of the qualitative processing categorization illustrated in FIG. 10 obtained by inputting exemplary values to it. In FIG. 11, specific values are only exemplary, and values actually used are prescribed at the activation of a virtual machine, or are set appropriately by the writer or user of the program.

The method of adjusting a compilation timing of programs (methods) of characteristics (b) and (c) that has been explained above is applied to the three cases of an application program illustrated in FIG. 8, and the operations will be explained.

Case 1 (performance difference is large between stable and unstable periods, and unstable period (period before the execution performance becomes stable) is short) appears usually when compilation processes concentrate in a short period (high concentration degree). Whether or not the compilation concentration is the main factor of unstable performance can be determined on the basis of whether or not the concentration period and the unstable period roughly coincide (when this determination is made on the basis of numerical values, a case where (unstable period)/(concentration period) is close to 1.0 is the case, and thus when this value is, for example, 1.2 or smaller, the compilation concentration is determined to be the main factor). Compilation timing of programs (methods) with IMPORTANCE DEGREE 1 is expedited, while compilation timing of programs (methods) of programs with IMPORTANCE DEGREEs 2 through 4 is delayed. In doing this, the higher (closer to 4) the importance is, the more the compilation is delayed. Also, while the performance difference between stable and unstable periods is considered, because the larger the performance difference is, the greater the influence caused by the compilation concentration is, the timing of compilation of programs with a low importance (IMPORTANCE DEGREE 4) is delayed if the performance difference is large. By contrast, regarding very important programs, the larger the performance difference is, the more the compilation timing is expedited so as to shift to native-code based execution earlier.

Case 2 (the performance difference between unstable and stable periods is small, and an unstable period (period before the execution performance becomes stable) is long) usually appears when compilation processes advance gradually (the concentration degree is low, the execution is late in being shifted to native-code bases exaction). This situation can be determined on the basis of whether or not the unstable period is longer than the period when compilation processes concentrate (when this determination is made on the basis of numerical values, a case where (unstable period)/(concentration period) is large is the case, and thus when this value is 1.5 or greater, the situation is determined to be this case). When an importance is higher than usual (IMPORTANCE DEGREEs 1 through 3), the timing of compilation is expedited so as to expedite the shift to native-code based execution. In doing this, the higher the importance is, the earlier the compilation is performed. Also, while the performance difference between stable and unstable periods is taken into consideration, the larger the performance difference is, the more the compilation timing is expedited because the larger the performance difference is, the more the delay in timing of shifting to native-code based execution is influenced. By delaying the timing of compiling programs with IMPORTANCE DEGREE 4 to a similar degree that the timing of compiling programs with IMPORTANCE DEGREEs 1 through 3 is expedited, a balance of influence of compilation time can be achieved (compilation timing of programs with IMPORTANCE DEGREE 1 is expedited when the performance difference is large, and accordingly the compilation timing of programs with IMPORTANCE DEGREE 4 is delayed when the performance difference is large).

Case 3 (the performance difference between unstable and stable periods is large, and an unstable period (period before the execution performance becomes stable) is long) is considered a rare case; however, a case where a period when compilation processes concentrate continues for a long time or the performance difference between execution by an interpreter and native-code based execution is large (or a case where these situations exist in a complex manner) is the case. In such a case, because of the large performance difference between unstable and stable periods and the long unstable period, this case may be determined to be highlyconcentration degree. However, coefficients are determined by using a method different from that in case 1 (which may similarly be categorized as highly important). Discrimination between case 1 and case 3 is made on the basis of whether or not the concentration period and unstable period roughly coincide (that is (unstable period)/(concentration period) is 1.2 or smaller in terms of number) because the compilation concentration in a short period is the main factor. In case 3, compilation concentration is not always a factor, and accordingly a determination is made on the basis of whether or not the unstable period is longer than the concentration period (in terms of number, (unstable period)/(concentration period) is greater than 1.2; note that this value is referred to later as a compilation concentration period influence ratio). In such a case, the ratio of programs involving a delay in shifting to native codes is higher in case 1 than in case 3, and accordingly the compilation timing is expedited compared to case 1, both in cases where compilation timing is expedited (IMPORTANCE DEGREE 1) and where it is delayed (IMPORTANCE DEGREE 4).

When the concentration degree is intermediate, coefficients are set so that situations where the concentration degree is between a low concentration degree and a high concentration degree can be responded to.

Although explanations have been given for an implement where adjustment is performed automatically in accordance with the concentration degree, it is also possible to employ a configuration in which one of the adjustment methods can be specified in accordance with human decisions.

Figure 12:
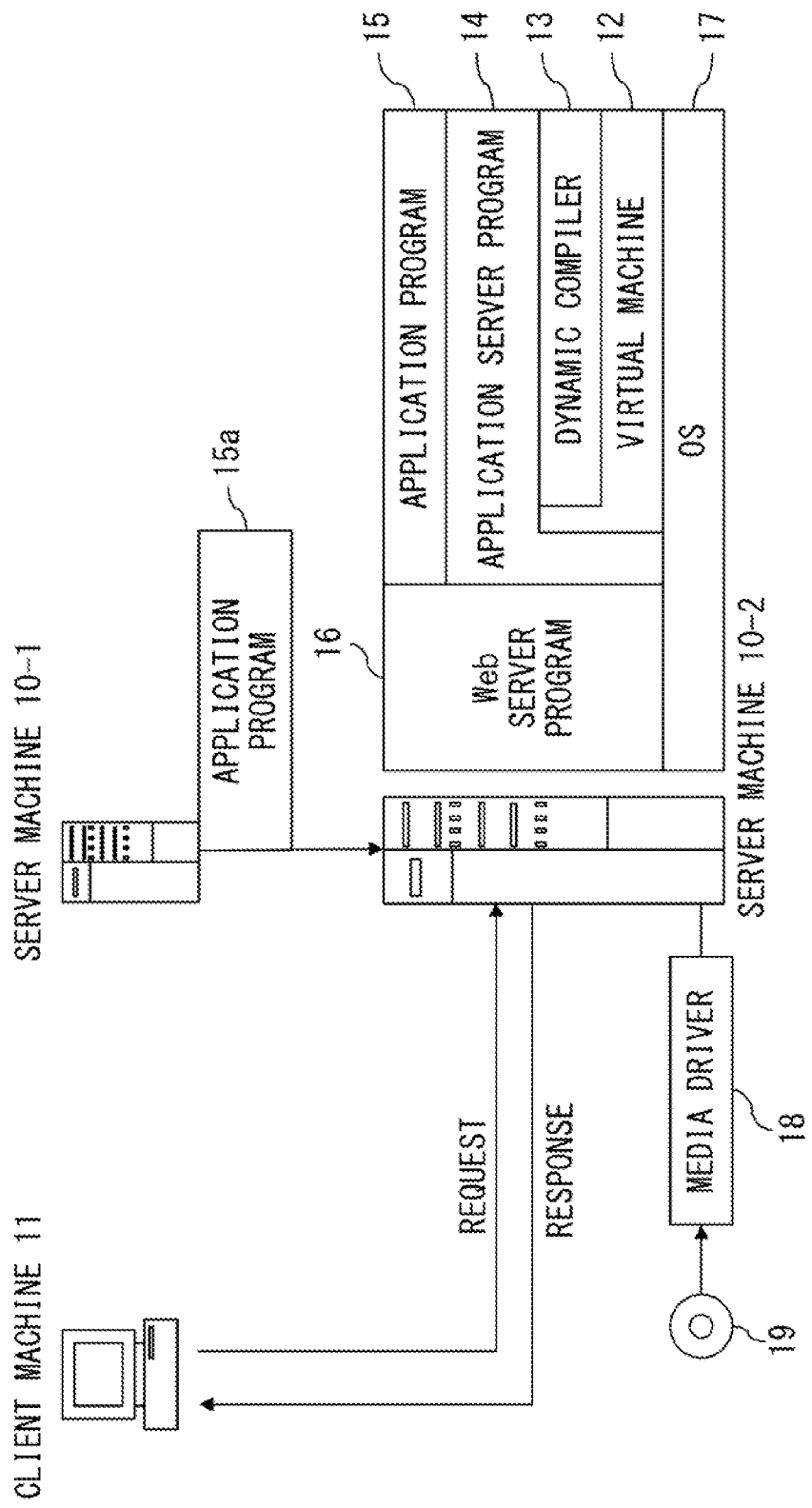
FIG. 12 illustrates a configuration example of a system to which the present embodiment is applied.

FIG. 12 illustrates a configuration example of a system to which the present embodiment is applied.

The present embodiment is implemented by an application server program 14 installed in server machines (application servers) 10-1 and 10-2, a virtual machine 12 included in the application server program, and a dynamic compiler 13 operating on the virtual machine. An application program 15 operates on the application server program 14. A web server program 16 serves as an interface, such as by handing over application programs and data, and operates on an OS (operating system) 17.

The server machine 10-2 includes the above web server program 16 and the OS 17, and communicates with a client machine 11 or the server machine 10-1 through a network. The server machine 10-2 receives requests to execute application programs from the client machine 11, and returns responses to such requests to the client machine 11. Also, the server machine 10-2 receives an application program 15a from the server machine 10-1 through a network, and installs the received application program 15a on the server machine 10-2. Because the server machine 10-2 can receive the application program 15a from the server machine 10-1, the server machine 10-2 can respond to a situation where it has received requests from the client machine 11 to execute an application program 15 that has not been installed in the server machine 10-2 itself.

Also, a program that implements the present embodiment is implemented by being included in the virtual machine 12; however, this program may be downloaded through a network from the server machine 10-1 to the server machine 10-2 so as to be installed in the server machine 10-2. Alternatively, a program that implements processes of the present embodiment may be stored in a portable storage medium 19 such as a CD-ROM, a DVD, IC memory, a flexible disk, a Blu-ray disk, or the like. In such a case, the program stored in the portable storage medium 19 is read by a media driver 18 so as to be installed in the server machine 10-2.

FIG. 13 illustrates block configurations of respective functions operating on an application server.

An application server 20 includes a virtual machine activation unit 21, a request transmission unit 22, and an application execution performance (response performance) measurement/reporting unit 23.

The virtual machine activation unit 21 (1) activates the virtual machine 12, and starts the activation of the application program 15 so that the application program 15 as the operation target can be executed on the virtual machine 12. The virtual machine activation unit 21 (2) transmits to the virtual machine 12 an activation completion report of the application program 15 when the activation of the application program 15 is completed and the operation of the application program 15 (receiving requests) has been prepared. Next, the request transmission unit 22 (3) transmits a request to the application program 15 operating on the virtual machine 12. The application execution performance measurement/reporting unit 23 of the application (4) measures the execution performance (response performance) of the application, and measures the performance difference between periods before and after the execution performance has become stable and a period before the performance becomes stable. When the application execution performance measurement/reporting unit 23 has determined the performance to have become stable, it reports this fact to the virtual machine 12.

Figure 14:
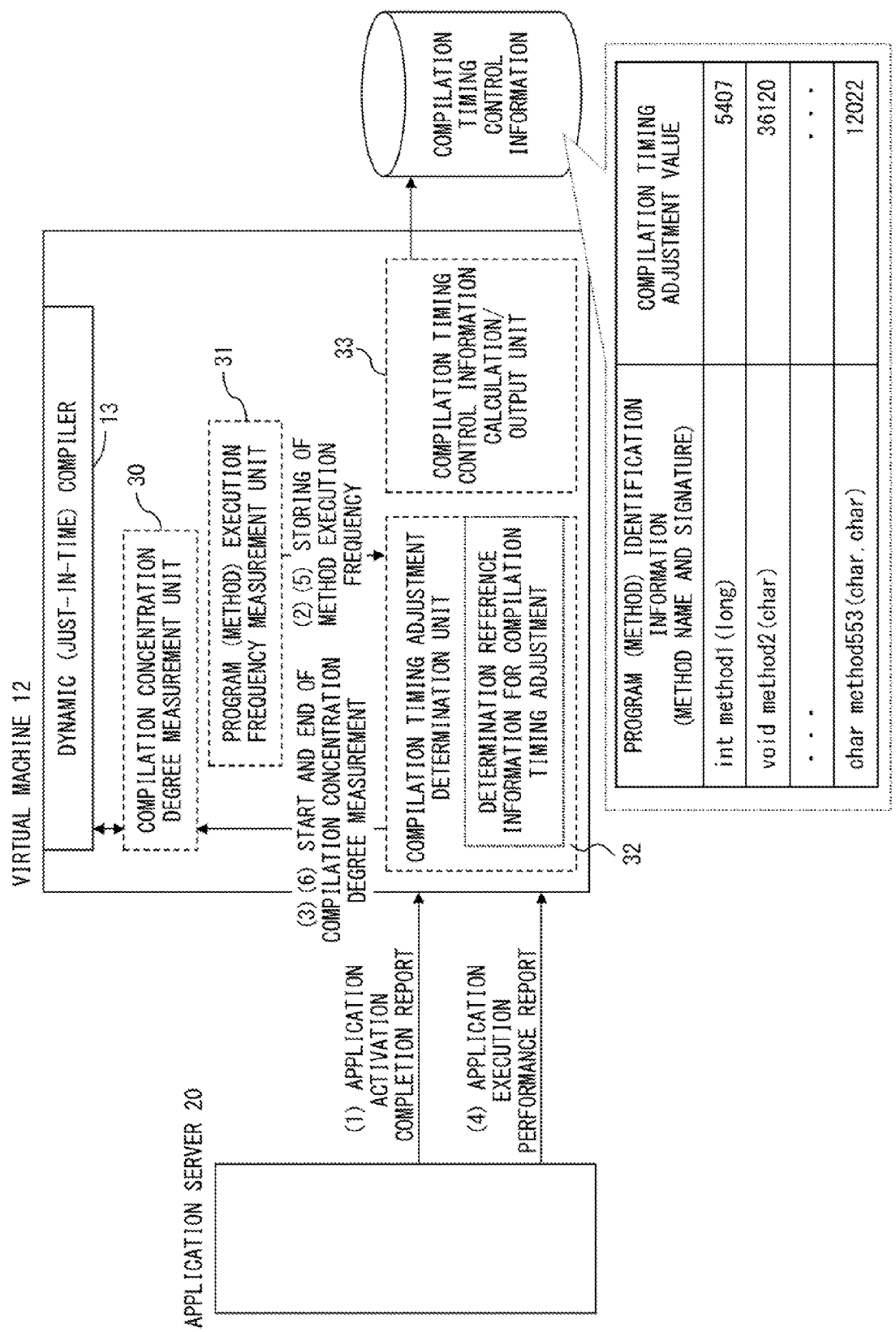
FIG. 14 illustrates operations on a virtual machine and operations by a dynamic compiler of a virtual machine (first)

FIGS. 14 and 15 explain operations on a virtual machine and operations by a dynamic compiler on a virtual machine.

The virtual machine 12 includes, in addition to the dynamic compiler 13, a compilation concentration degree measurement unit 30, a program (method) execution frequency measurement unit 31, a compilation timing adjustment determination unit 32, and a compilation timing control information calculation/output unit 33 (which are illustrated in FIG. 14), and a compilation timing control information input/determination unit 34 (which is illustrated in FIG. 15).

The compilation concentration degree measurement unit 30 measures compilation processes executed by the dynamic compiler 13, and records the number of programs (methods) compiled in a prescribed term and in a prescribed unit of time in order to obtain the compilation concentration degree. A prescribed term is a period between two points in time for obtaining the determination reference information for compilation timing adjustment.

When a program (method) is called, the program (method) execution frequency measurement unit 31 records the execution frequency of that program (method). The compilation timing adjustment determination unit 32 activates the compilation concentration degree measurement unit 30 and the program (method) execution frequency measurement unit 31, or receives reports from the application server 20, and thereby collects the determination reference information for compilation timing adjustment in order to determine the compilation timing of each program (method) on the basis of the collected information.

Procedures followed by the compilation timing adjustment determination unit 32 are as follows.

(1) When an activation completion report of an application program is received from the application server 20, (2) the compilation timing adjustment determination unit 32 refers to the execution frequency recorded by the program (method) execution frequency measurement unit 31 so as to store the execution frequency of each program (method) at that time point (when the activation of the application program has finished). Also, (3) the compilation timing adjustment determination unit 32 instructs the compilation concentration degree measurement unit 30 to start to record the compilation concentration degree.

(4) When the compilation timing adjustment determination unit 32 has received a report of application execution performance (performance difference between periods before and after the execution performance has become stable, and a period before the execution performance becomes stable) from the application server 20 at a time point when the application performance has become stable, (5) it refers to the execution frequency recorded by the program (method) execution frequency measurement unit 31. Also, it stores the execution frequency for each program (method) at that time point (when the application performance has become stable). Also, (6) the compilation timing adjustment determination unit 32 instructs the compilation concentration degree measurement unit 30 to halt the recording of the compilation concentration degree. Information obtained by following the above processes (1) through (6) is determination reference information for compilation timing adjustment.

The compilation timing control information calculation/output unit 33 determines the timing of compiling each program (method) on the basis of determination reference information for compilation timing adjustment, and outputs the compilation timing control information. Compilation timing control information has identification information and a compilation timing adjustment value for one program (method) that receives compilation timing adjustment. A compilation timing adjustment value represents the number of times of executing a program (method); when the number of times of execution has reached this value, an instruction to compile this program is issued. Specifically, a value obtained by multiplying a coefficient explained in FIG. 11 by a prescribed value is used.

As illustrated in FIG. 15, the compilation timing control information input/determination unit 34 operates when the virtual machine 12 is activated by using compilation timing control information. When there is compilation timing control information corresponding to an application program, the application server 20 performs activation after reporting compilation timing control information when the virtual machine 12 is activated. The virtual machine 12 reads compilation timing control information by using the compilation timing control information input/determination unit 34. Also, when a program (method) is called and the execution frequency of that program (method) has reached the value specified by the compilation timing control information, the virtual machine 12 requests that dynamic compiler 13 compile that program (method).

In conventional techniques, execution frequencies for requesting compilation have been fixed values for all programs (methods). However, according to the present embodiment, when an execution frequency has reached a value that is adjusted for each program (method) (compilation adjustment value of compilation timing control information), the dynamic compiler 13 is requested to compile that program (method). When the corresponding program (method) is not included in compilation timing information, this request is made when the execution frequency has reached a reference value determined at the activation of the virtual machine 12.

FIG. 16 is an operation flowchart for a virtual machine activation unit.

In step S10, whether or not there is compilation timing control information, and whether the activation is based on this information, is determined. When the result in step S10 is Yes, the process proceeds to step S11, and when the result is No, the process proceeds to step S12. In step S11, the virtual machine is activated, and an application program to be executed and compilation timing control information are reported to the virtual machine. In step S12, the virtual machine is activated, and an application program to be executed and the fact that compilation control information is not used are reported to the virtual machine. In step S13, when the operation by the application program has become ready to start, an activation completion report of the application program is reported to the virtual machine, and the process terminates.

FIG. 17 is an operation flowchart of an application program execution performance measurement/reporting unit.

FIG. 18 represents data used by the application program execution performance measurement/reporting unit.

Pieces of data (1), (2), and (4) in FIG. 18 are stored in memory used by the application server, and piece of data (3) is stored in memory used by a virtual machine. As a record of the average execution performance of (1), a record number is set each time average execution performance is measured for an application program, and the average execution performance, i.e., an average response time, is recorded in units of milliseconds. The number of times of recording the average execution performance of (2) is the maximum number for the recorded number of the average execution performance, and is set in advance. Execution performance information reported from the application server of (3) contains the performance difference between periods before and after the execution performance has become stable and the period before the execution performance becomes stable. The maximum number of times of recording average execution performance of data of (4), the change ratio of stability determination of execution performance, and the number of times of sampling the execution performance determination use values that are prescribed at the activation of the virtual machine.

In step S15 in FIG. 17, only the number of times of sampling execution performance determination is measured as the execution performance (response time) of an application program, the average execution performance is obtained, and the obtained average is recorded as the average execution performance. This number of times of sampling is prescribed. In step S16, it is determined whether or not the change ratio of the average execution performance is smaller than the change ratio of the stabilization determination of the execution performance compared with the average execution performance that was recorded previously. When the result in step S16 is Yes, the process proceeds to step S18. When the result in step S16 is No, the process proceeds to step S17. In step S17, it is determined whether or not the number of times of recording the average execution performance is greater than the maximum number of times of recording the average execution performance. When the result in step S17 is Yes, the process proceeds to step S18, and when the result in step S17 is No, the process returns to step S15. In step S18, the performance difference between periods before and after the execution performance has become stable is obtained from ((performance difference between periods before and after the execution performance has become stable)=(average execution performance recorded before stabilization)/(average execution performance recorded after stabilization)) in accordance with the ratio between the levels of execution performance that were recorded first and last. The obtained ratio is reported to the virtual machine. Also, a period before the application program becomes stable is obtained from the difference between the time points at which the levels of average execution performance were recorded first and last.

Figure 19A:
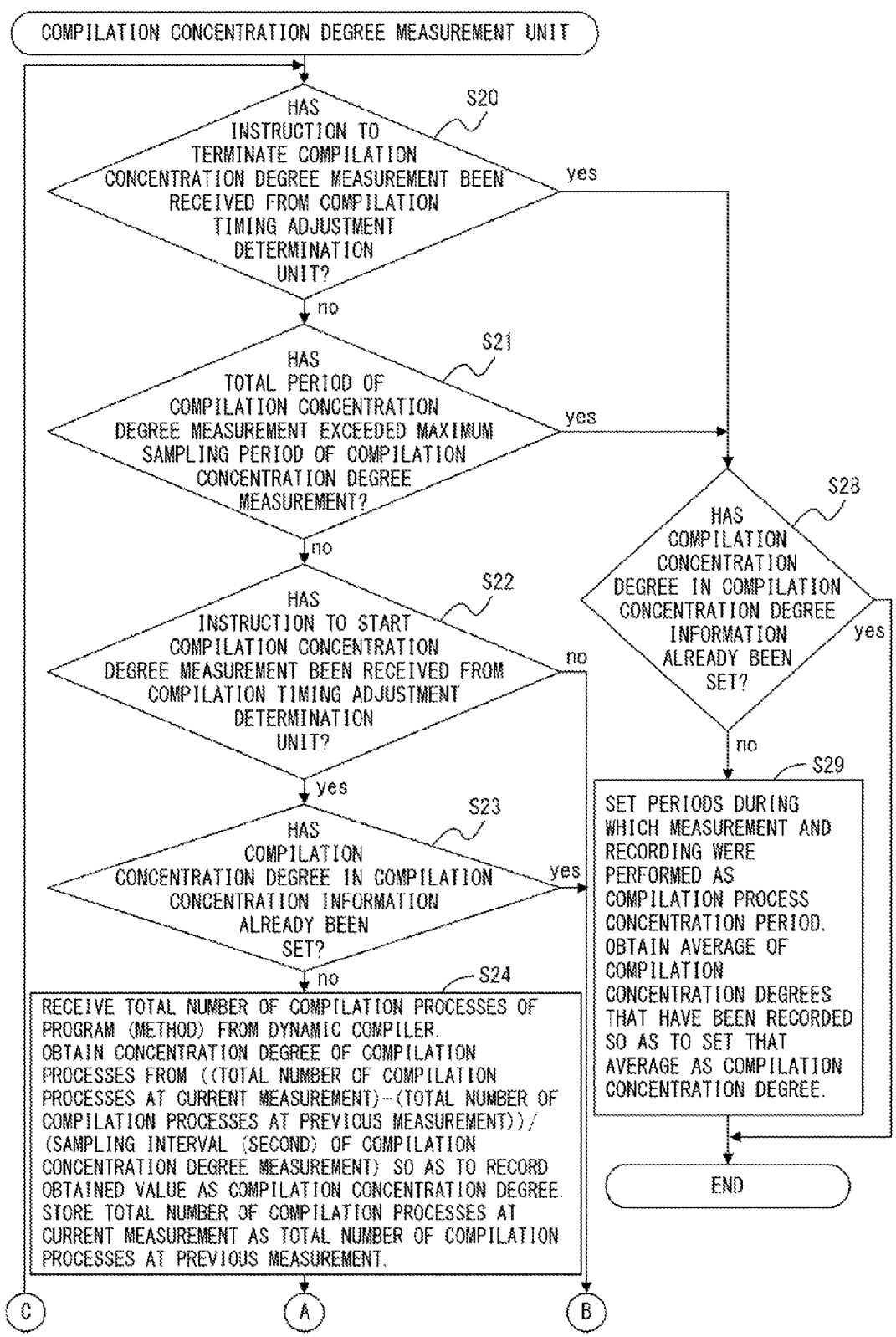
FIG. 19A is an operation flowchart of a compilation concentration degree measurement unit (first)
Figure 19B:
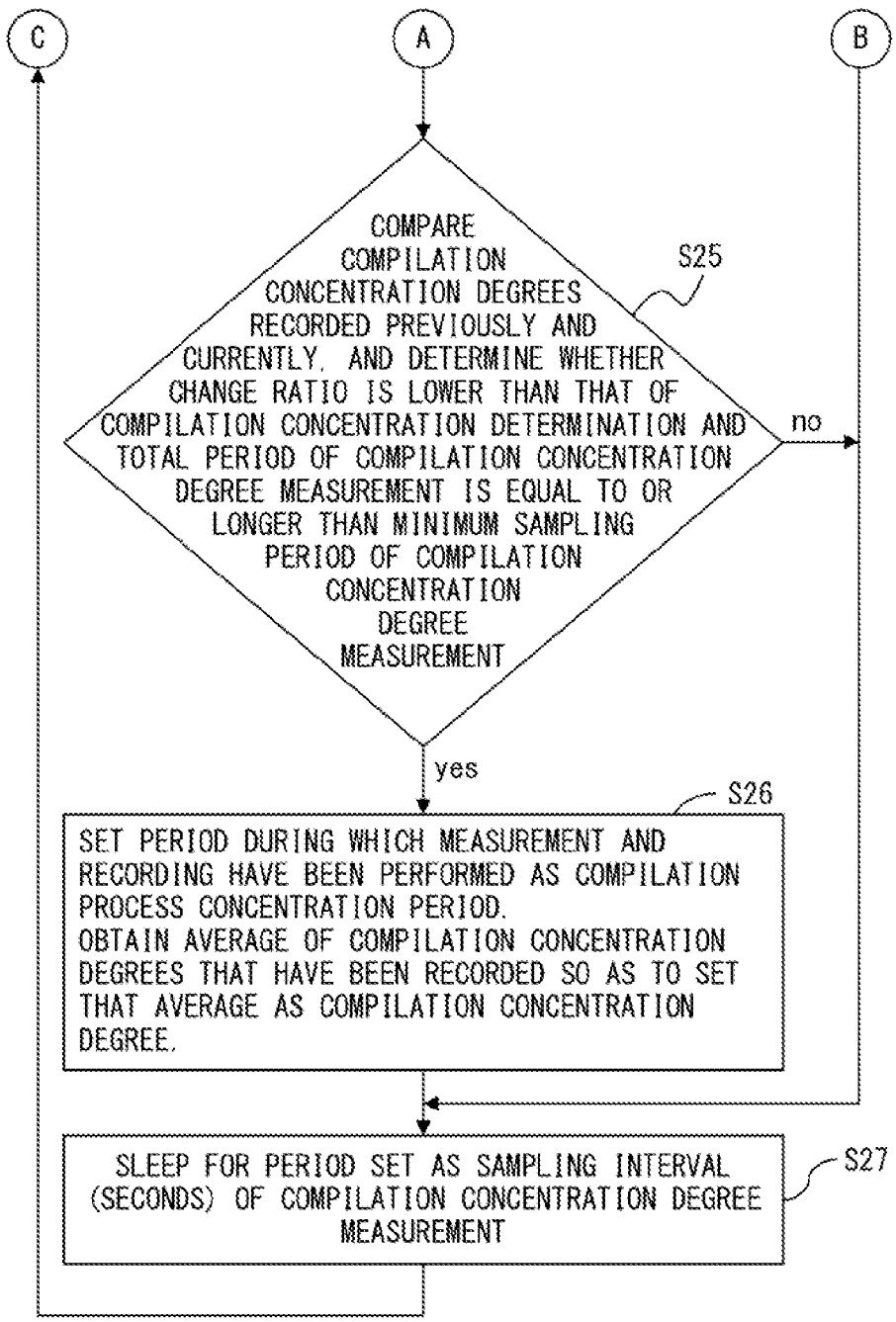
FIG. 19B is an operation flowchart of a compilation concentration degree measurement unit (second)

FIGS. 19A and 19B are operation flowcharts of the compilation concentration degree measurement unit. FIG. 20 illustrates data used by the compilation concentration degree measurement unit.

Data in FIG. 20 is stored in memory used by a virtual machine. The record of compilation concentration degrees of (1) includes a recording number of compilation concentration degree that is assigned for each measurement, a measurement period (in units of seconds, for example) of compilation concentration degree, which is the time at which each measurement was performed, the concentration degree of compilation processes (in units of numbers of processes per second for example), which is the number of processes that were detected to be being executed. Data of (2) includes the number of times of recording compilation concentration degrees, and the total number of compilation processes that have finished before the previous measurement. Data of (3) includes periods when compilation processes concentrate, and compilation concentration degrees (in units of the number of processes per second, for example). Data of (4) includes sampling intervals of the compilation concentration degree measurement, the minimum sampling period of the compilation concentration degree measurement, the maximum sampling period of the compilation concentration degree measurement, and the change ratio of the compilation concentration degree determination, and these factors use values prescribed at the activation of a virtual machine.

In FIGS. 19A and 19B, the compilation concentration degree measurement unit determines in step S20 whether or not an instruction to terminate the compilation concentration degree measurement has been received from the compilation timing adjustment determination unit. When the result in step S20 is Yes, the process proceeds to step S28. When the result in step S20 is No, it is determined in step S21 whether or not the total period of the compilation concentration degree measurement has exceeded the maximum sampling period of compilation concentration degree measurement. When the result in step S21 is Yes, the process proceeds to step S28. When the result in step S21 is No, it is determined in step S22 whether or not an instruction to start compilation concentration degree measurement has been received from the compilation timing adjustment determination unit.

When the result in step S22 is No, the process proceeds to step S27. When the result in step S22 is Yes, it is determined in step S23 whether or not the compilation concentration degree in the compilation concentration information has already been set. When the result in step S23 is Yes, the process proceeds to step S27. When the result in step S23 is No, the total number of compilation processes of the program (method) is received in step S24 from the dynamic compilation unit (which will be described later). Next, the concentration degree of the compilation processes is obtained from (concentration degree of compilation processes)=((total number of compilation processes at the current measurement)−(total number of compilation processes at the previous measurement))/(sampling interval (in units of seconds) of compilation concentration degree measurement) so as to record the obtained value as the compilation concentration degree. Also, the total number of compilation processes at the current measurement is stored as the total number of compilation processes at the previous measurement.

In step S25, the compilation concentration degree recorded previously and the compilation concentration degree recorded currently are compared, and it is determined whether or not the change ratio is lower than the change ratio of the compilation concentration determination and whether the total period of compilation concentration degree measurement is equal to or greater than the minimum sampling period of the compilation concentration degree measurement. When the result in step S25 is No, the process proceeds to step S27. When the result in step S25 is Yes, the process proceeds to step S26.

In step S26, the period during which the measurement and the recording have been performed is set as the compilation process concentration period, and the average of the compilation concentration degrees that have been recorded is obtained so as to set that average as the compilation concentration degree. In step S27, the system sleeps for a period set as the sampling interval (seconds) of the compilation concentration degree measurement, and the process returns to step S20.

In step S28, it is determined whether or not the compilation concentration degree of the compilation concentration degree information has already been set. When the result in step S28 is No, the process proceeds to step S29. When the result in step S28 is Yes, the process terminates. In step S29, the period during which the measurement and recording were performed is set as the compilation process concentration period, and the average of the compilation concentration degrees that have been recorded is obtained so as to set that average as the compilation concentration degree. Thereafter, the process terminates.

Figure 21:
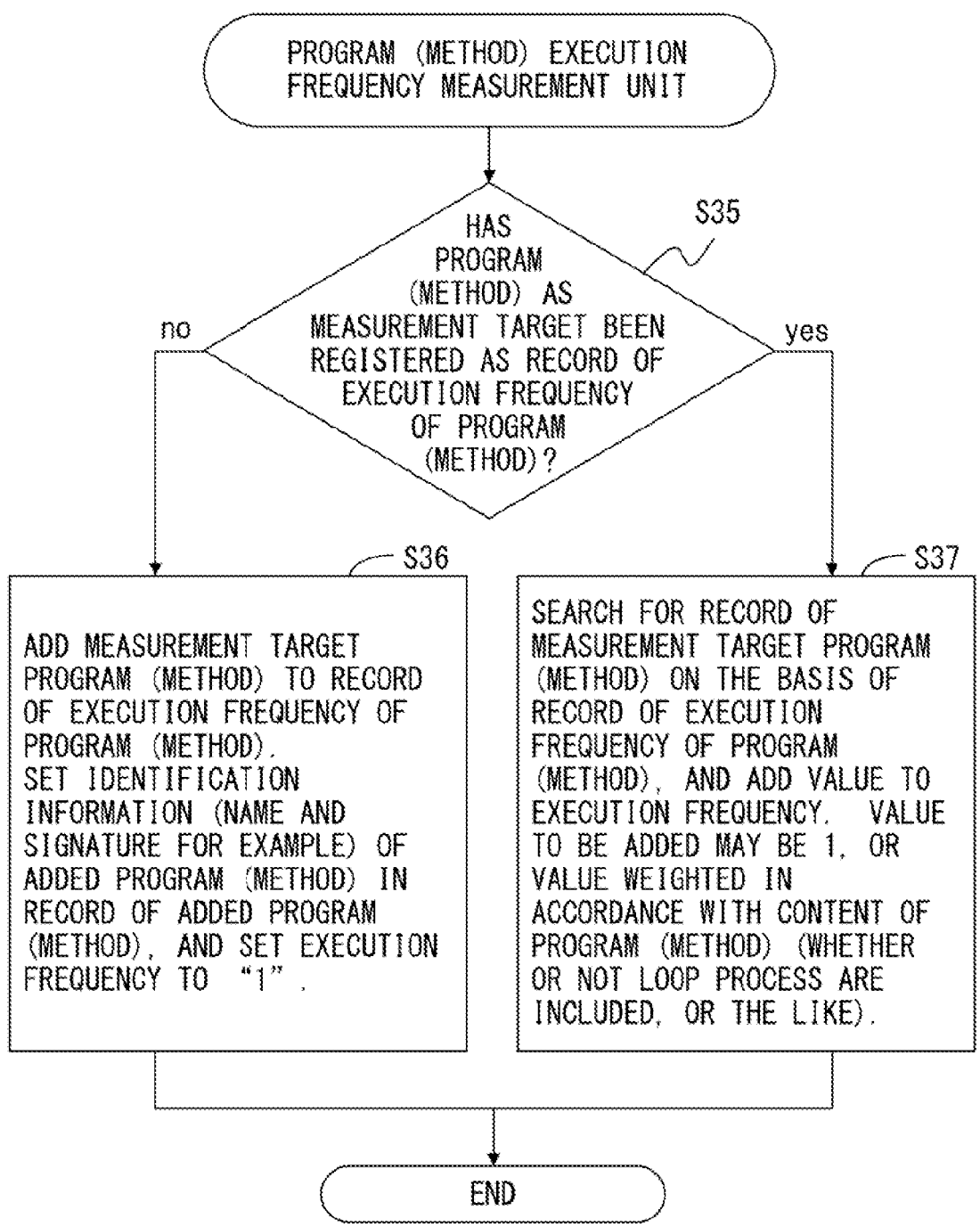
FIG. 21 is an operation flowchart of a program (method) execution frequency measurement unit.

FIG. 21 is an operation flowchart of the program (method) execution frequency measurement unit. FIG. 22 illustrates data used by the program (method) execution frequency measurement unit.

The data in FIG. 22 is stored in memory used by a virtual machine. In records of the program (method) execution frequencies in FIG. 22, the name of the method and its signature are stored as the identification information of that program (method). The execution frequencies and the compilation statuses of the programs (methods) are stored in such a manner that they correspond to the identification information. As an execution frequency, the number of times of executing the method between the start of the measurement of the execution frequency and the currently recorded time point is recorded. As a record of a program execution frequency, there is an item for recording the status of whether or not the program has been compiled. This item is false as the initial value, and when a program (method) has been compiled by a dynamic compiler, the status of the corresponding program (method) is switched to true.

In FIG. 21, the processes by the program (method) execution frequency measurement unit are executed when the virtual machine has called the program (method). In step S35, it is determined whether or not the program (method) as the measurement target has been registered as a record of the execution frequency of the program (method). When the result in step S35 is No, the measurement target program (method) is added to the record of the execution frequency of the program (method) in step S36, the identification information of that program (method) is set in the record of the added program (method), the execution frequency is set to "1", and the process terminates. When the result in step S35 is Yes, a search is conducted for the record of the measurement target program (method) on the basis of the record of the execution frequency of the program (method), and the value is added to the execution frequency in step S37. The value to be added may be 1, or may also be a value that is weighted in accordance with the content of the program (method). Weighting in accordance with content is weighting in accordance with the execution load of that program (method) based on the size of the program (method) or whether or not loop processes are included. When the process in step S37 terminates, the entire process terminates.

Figure 23A:
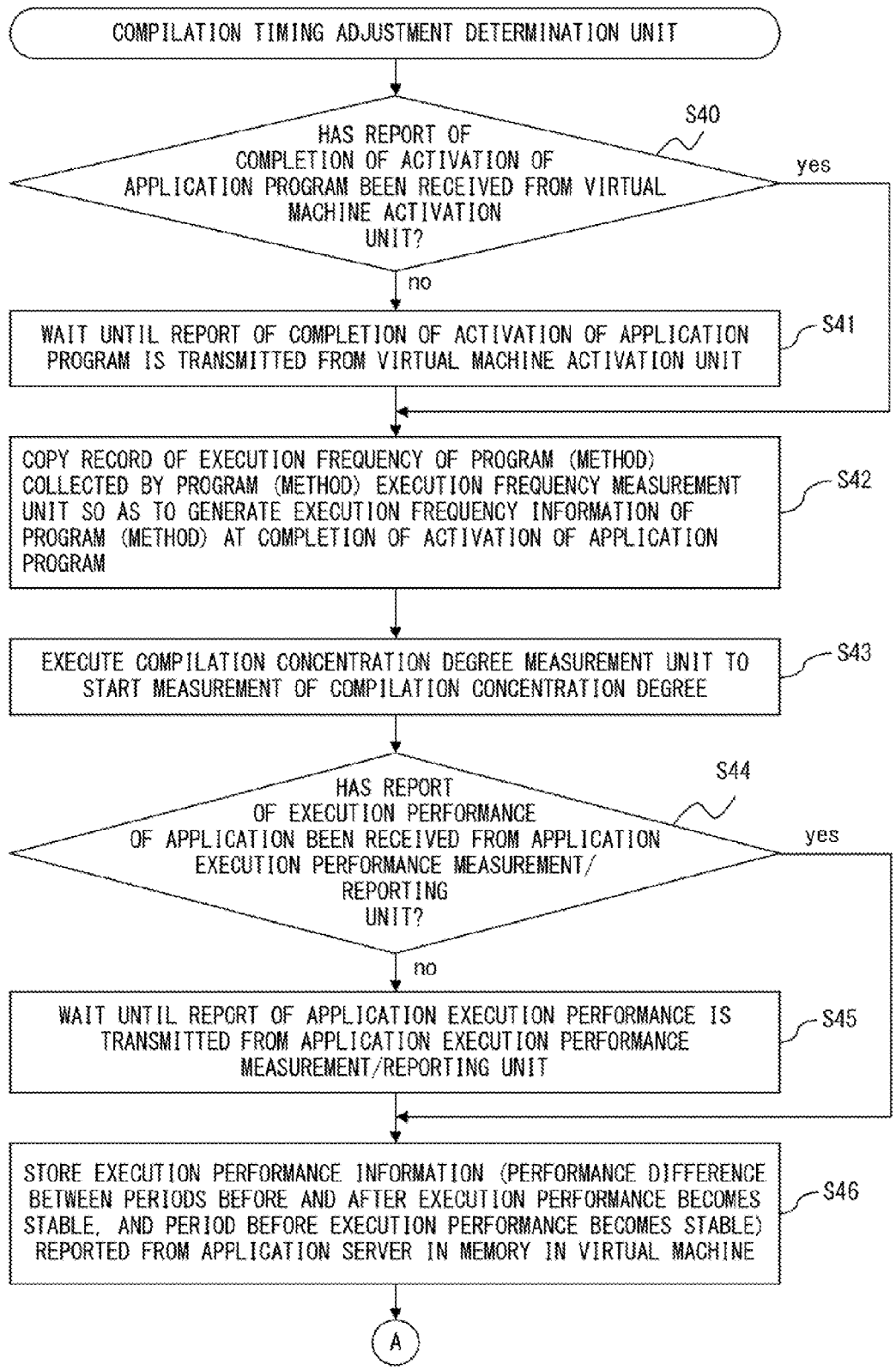
FIG. 23A is an operation flowchart of a compilation timing adjustment determination unit (first)
Figure 23B:
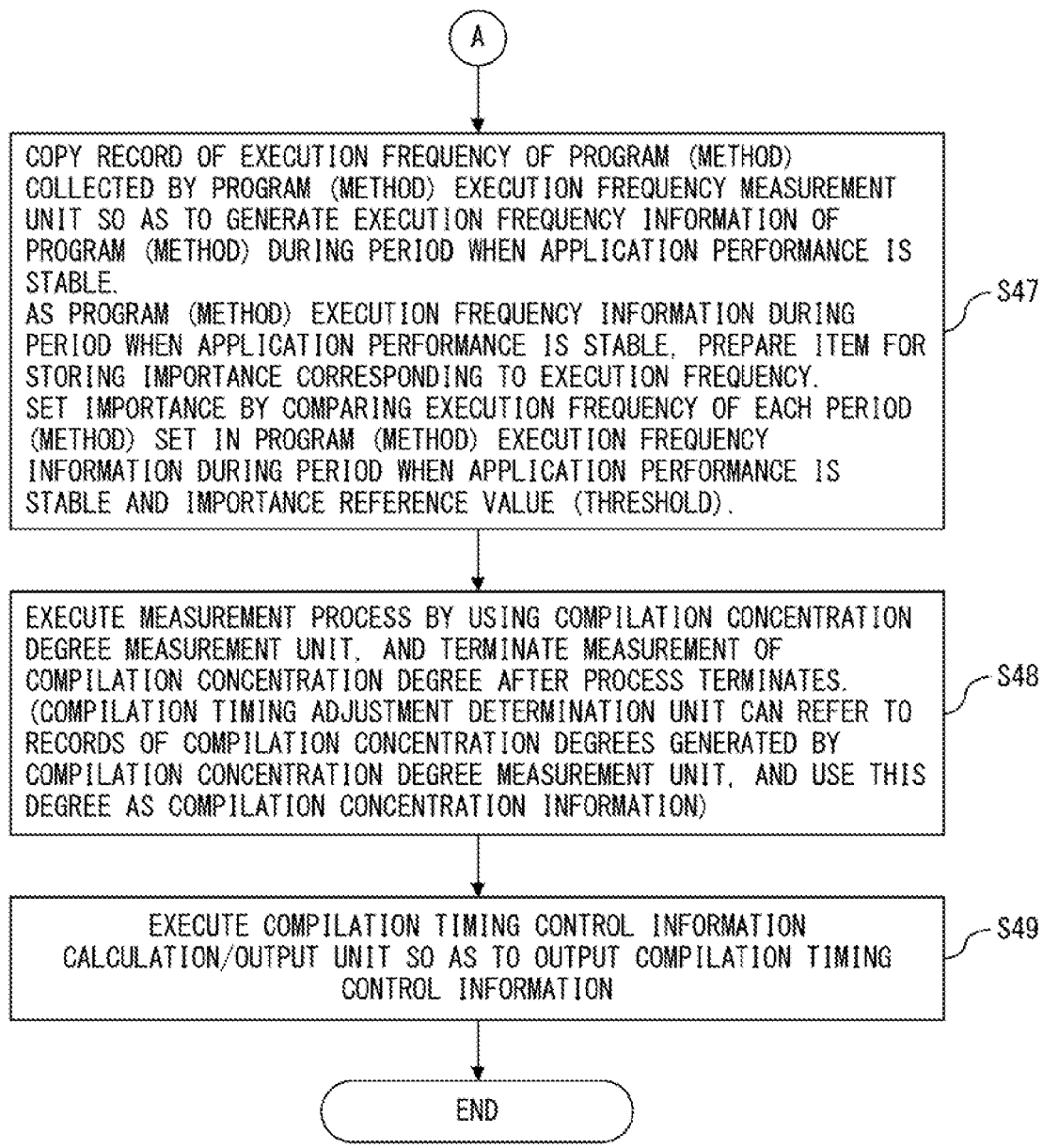
FIG. 23B is an operation flowchart of a compilation timing adjustment determination unit (second)

FIGS. 23A and 23B are an operation flowchart of the compilation timing adjustment determination unit. FIG. 24 illustrates data used by the compilation timing adjustment determination unit.

Data in FIG. 24 is stored on memory used by the virtual machine. As the reference values for determining the importance of the program (method) execution frequency of (1), intervals of execution frequencies are specified for categorizing measured execution frequencies into four levels of importance. Reference values for determining the levels of importance of program (method) execution frequencies are values that are prescribed at the activation of the virtual machine. (2) through (5) are determination reference information for compilation timing adjustment. (2) is program (method) execution frequency information at the completion of the activation of an application. This corresponds to the identification information of the program (method), and stores the execution frequency of the program (method) and compilation information. (3) is program (method) execution frequency information during a period with stable application execution performance. This corresponds to the identification information of the program (method), and includes the execution frequency of the period (method), the compilation information, and the importance obtained from (1). Data of (2) and (3) is generated from data illustrated in FIG. 22, which is measured when the application activation has finished and when the performance has become stable. (4) is compilation concentration information, and is generated by the compilation concentration degree measurement unit. This information includes data of a period when compilation processes concentrate and of the compilation process concentrate degrees (the number of processes per second). (5) is execution performance information reported from the application server, and includes the performance difference of execution performance between periods before and after the execution performance becomes stable, and a period before the execution performance becomes stable.

In FIGS. 23A and 23B, the compilation timing adjustment determination unit determines in step S40 whether or not a report of the completion of the activation of the application program has been received from the virtual machine activation unit. When the result in step S40 is Yes, the process proceeds to step S42. When the result in step S40 is No, the process proceeds to step S41.

In step S41, the process waits until the report of the completion of the activation of the application program is transmitted from the virtual machine activation unit. In step S42, the record of the execution frequency of the program (method) collected by the program (method) execution frequency measurement unit is copied so as to generate the execution frequency information of the program (method) at the completion of the activation of the application program. In step S43, the compilation concentration degree measurement unit executes the measurement of the compilation concentration degree.

In step S44, it is determined whether or not a report of the execution performance of the application program has been received from the application program execution performance measurement/reporting unit. When the result in step S44 is Yes, the process proceeds to step S46. When the result in step S44 is No, the process waits, in step S45, until the report of the application execution performance is transmitted from the application execution performance measurement/reporting unit.

In step S46, the execution performance information reported from the application server is stored in memory in a virtual machine. Execution performance information includes the performance difference between periods before and after the execution performance becomes stable, and a period before the execution performance becomes stable.

In step S47, the record of the execution frequency of the program (method) collected by the program (method) execution frequency measurement unit is copied so as to generate the execution frequency information of the program (method) during a period when the application performance is stable. Also, as the program (method) execution frequency information during a period when the application performance is stable, an item for storing importance degree corresponding to the execution frequency is prepared. Importance degree is set by comparing the execution frequency of each period (method) execution frequency information during a period when the application performance is stable and the importance degree reference value (threshold).

In step S48, a measurement process is executed by using the compilation concentration degree measurement unit, and when the measurement process terminates, the measurement of the compilation concentration degree terminates. Records of the compilation concentration degrees generated by the compilation concentration degree measurement unit can be referred to by the compilation timing adjustment determination unit, and this degree is used as compilation concentration information. In step S49, the output unit executes a compilation timing control information calculation/output unit so as to output compilation timing control information.

Figure 25A:
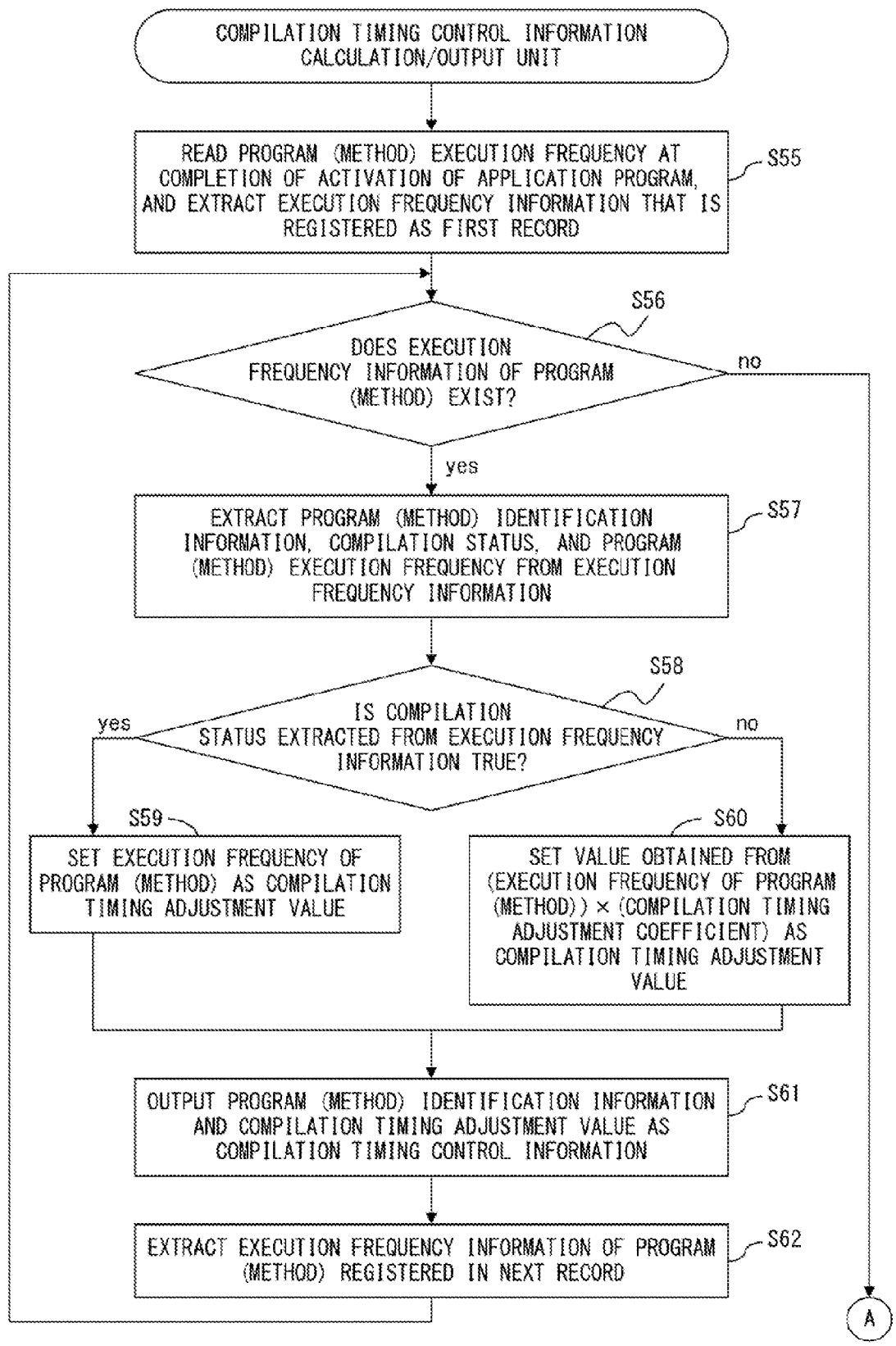
FIG. 25A is an operation flowchart of a compilation timing control information calculation/output unit (first)
Figure 25B:
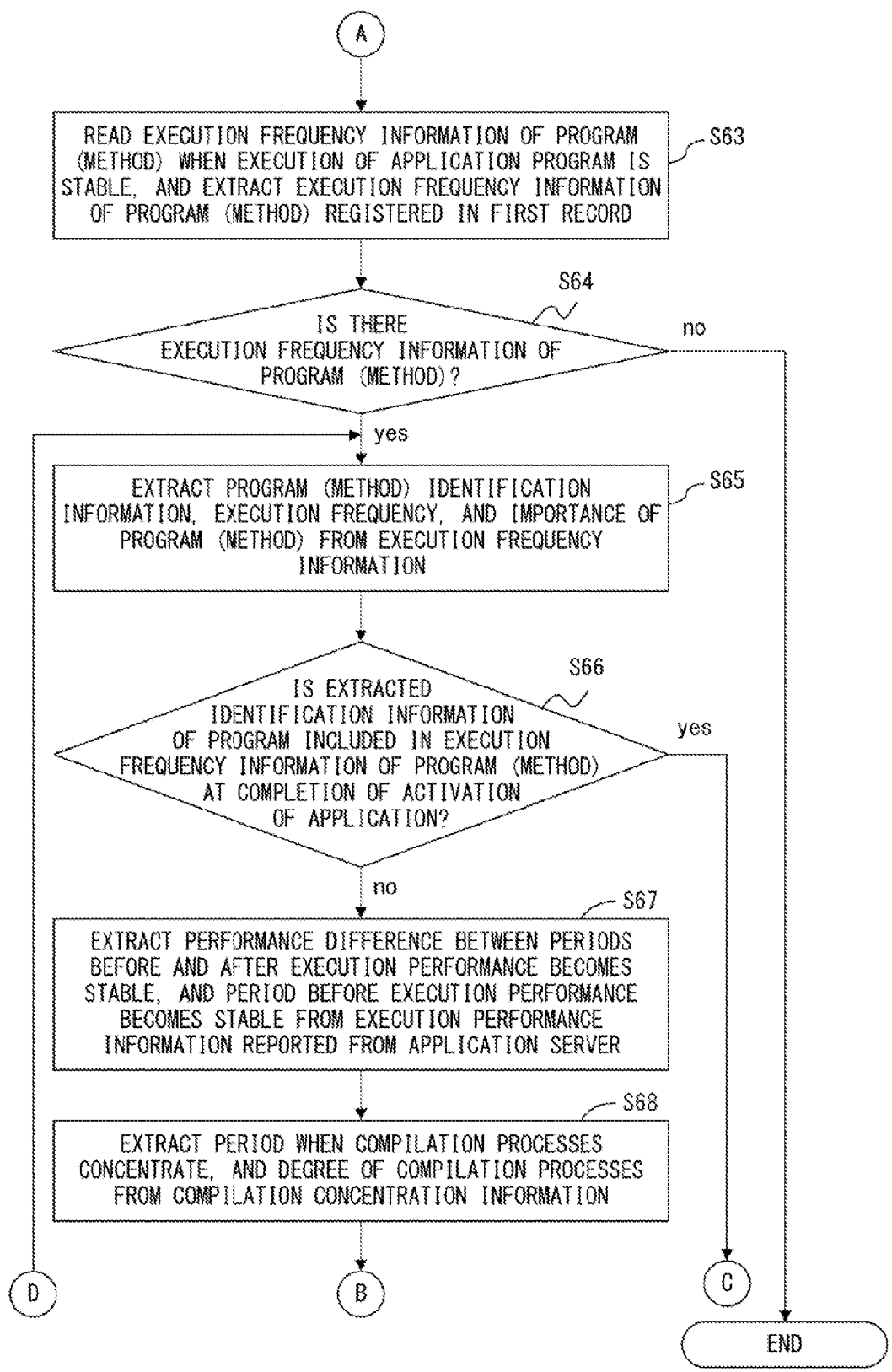
FIG. 25B is an operation flowchart of the compilation timing control information calculation/output unit (second)
Figure 25C:
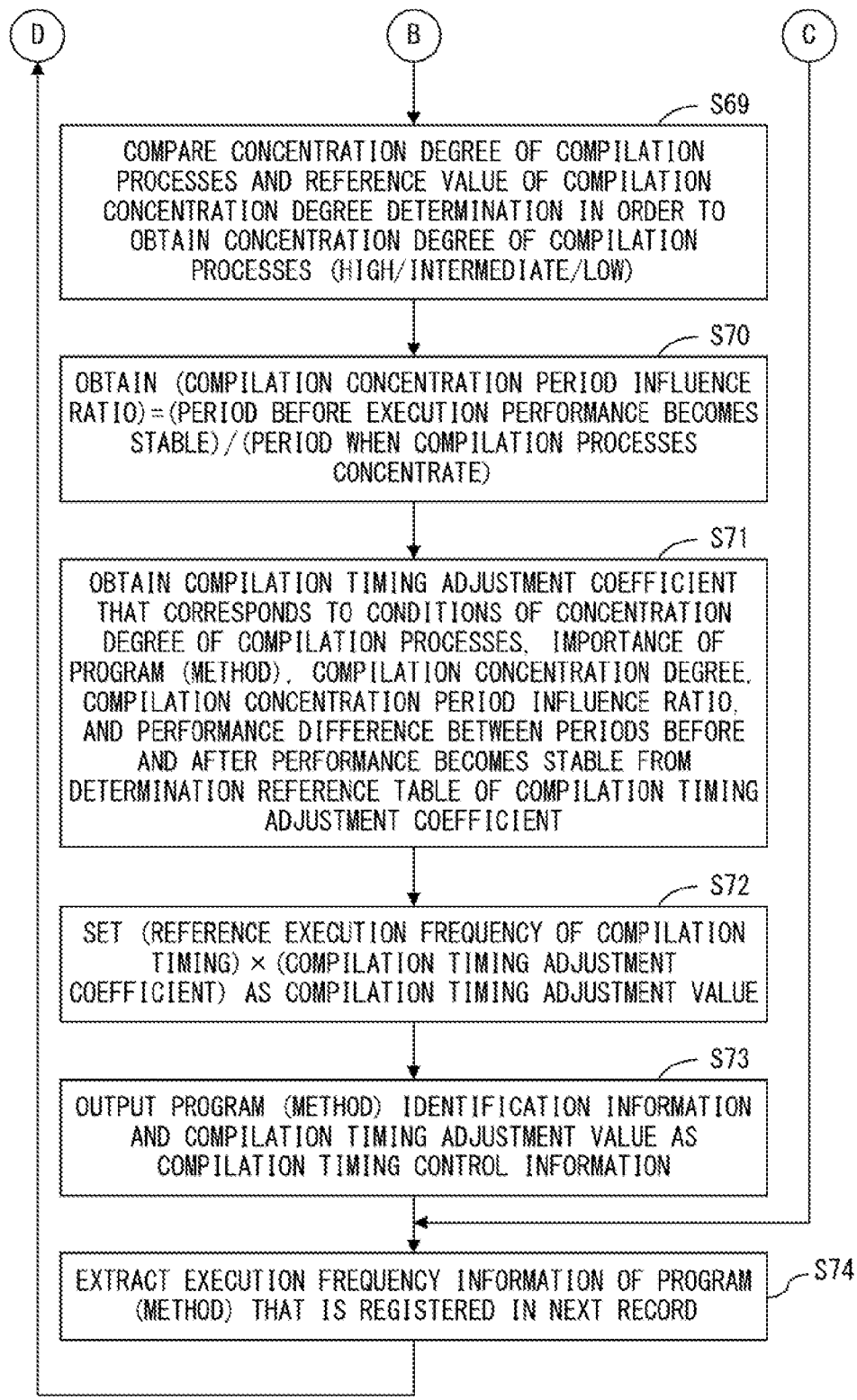
FIG. 25C is an operation flowchart of the compilation timing control information calculation/output unit (third)

FIGS. 25A, 25B, and 25C are operation flowcharts of the compilation timing control information calculation/output unit. FIGS. 26A and 26B illustrate data used by the compilation timing control information calculation/output unit.

Data illustrated in FIGS. 26A and 26B is set in memory used by a virtual machine. Also, the compilation timing control information calculation/output unit also uses the determination reference information for the compilation timing adjustment illustrated in FIG. 24. Values prescribed at the activation of the virtual machine are used as values of the determination reference table of a compilation timing adjustment coefficient, a compilation timing reference execution frequency, a compilation concentration degree determination reference value, and a compilation timing adjustment coefficient. Data of (1) includes a compilation timing adjustment coefficient and a compilation timing reference execution frequency. A compilation timing reference execution frequency is a reference value for the number of times of execution by an interpreter before the program (method) received compilation process, and is a prescribed value. A compilation timing adjustment coefficient is a value for varying the number of times of execution of the program (method) before a compilation process is executed, and is determined on the basis of the determination reference table of compilation timing adjustment coefficients.

The reference value for compilation concentration degree determination of (2) represents a reference value (threshold) for categorizing, into three levels, the number of programs (methods) that were compiled per unit of time, and the compilation concentration degrees are set to be high, intermediate, or low in accordance with these levels. The reference value for determining whether the performance difference of (3) is large or small represents a reference value (threshold) for categorizing into two levels (large or small) the performance difference between periods before and after stabilization. The determination reference table of compilation timing adjustment coefficients of (4) is a prescribed table, and is for setting compilation timing adjustment coefficients by using results of categorizing each program (method) by the importance and concentrate degree from the execution results by an interpreter of the application program. When the value of the compilation timing adjustment coefficient is 1.0, the compilation timing is not changed, and if this coefficient is greater than 1.0, the compilation timing is delayed, while if it is smaller than 1.0, the compilation timing is expedited.

As the compilation timing control information of (5), a compilation timing adjustment value is stored for each program (method). The compilation timing control information calculation/output unit generates and outputs this information after associating the identification information (method name and signature) of a program (method) and the compilation timing adjustment value. A compilation timing adjustment value is obtained by multiplying the reference execution frequency of compilation timing by the compilation timing adjustment coefficient obtained from the data of (4).

In FIGS. 25A, 25B, and 25C, the compilation timing control information calculation/output unit reads, in step S55, the program (method) execution frequency at the completion of the activation of the application program, and extracts the execution frequency information of a program (method) that is registered as the first record. In step S56, it is determined whether or not the execution frequency information of the program (method) exists.

When the result in step S56 is No, the process proceeds to step S63. When the result in step S56 is Yes, the program (method) identification information, the compilation status, and the program (method) execution frequency are extracted from the execution frequency information in step S57. In step S58, it is determined whether or not the compilation status extracted from the execution frequency information is true. The process proceeds to step S59 when the result in step S58 is Yes, and the process proceeds to step S60 when the result in step S58 is No.

In step S59, the execution frequency of the program (method) is set as the compilation timing adjustment value, and the process proceeds to step S61. In step S60, a value obtained from (execution frequency of program (method))× (compilation timing adjustment coefficient) is set as the compilation timing adjustment value. In step S61, the program (method) identification information and the compilation timing adjustment value are output as the compilation timing control information. In step S62, the execution frequency information of the program (method) registered in the next record is extracted, and the process returns to step S56. The reason why the compilation timing adjustment values of only methods whose compilation status is not true (i.e., whose compilation status is false) are varied is that methods with true compilation status have already been compiled, and thus there is no need for setting the compilation timing.

In step S63, the execution frequency information of a program (method) when the execution of the application program is stable, and the execution frequency information of the program (method) registered in the first record is extracted. In step S64, whether or not there is execution frequency information of the program (method) is determined. When the result in step S64 is No, the process terminates. When the result in step S64 is Yes, the process proceeds to step S65.

In step S65, the program (method) identification information, and the execution frequency and importance of the program (method) are extracted from the execution frequency information. In step S66, whether or not the extracted identification information of the program is included in the execution frequency information of the program (method) at the completion of the activation of the application program is determined. When the result in step S66 is Yes, the process proceeds to step S74, and when the result in step S66 is No, the process proceeds to step S67.

In step S67, the performance difference between periods before and after the execution performance becomes stable, and the period before the execution performance becomes stable, are extracted from the execution performance information reported from the application server. In step S68, the period when the compilation processes concentrate and the degree of compilation processes are extracted from the compilation concentration information. In step S69, the concentration degree of the compilation processes and the reference value of the compilation concentration degree determination are compared in order to obtain the concentration degree of compilation processes (high/intermediate/low).

In step S70, (compilation concentration period influence ratio)=(period before execution performance becomes stable)/(period when compilation processes concentrate) is obtained. In step S71, the compilation timing adjustment coefficient that corresponds to the conditions of the concentration degree of compilation processes, the importance of the program (method), the compilation concentration degree, the compilation concentration period influence ratio, and the performance difference between the periods before and after the performance becomes stable is obtained from the determination reference table of the compilation timing adjustment coefficient (See (3) in FIG. 26A). In step S72, (reference execution frequency of compilation timing)×(compilation timing adjustment coefficient) is set as the compilation timing adjustment value. In step S73, the program (method) identification information and the compilation timing adjustment value are output as the compilation timing control information. In step S74, the execution frequency information of the program (method) that is registered in the next record is extracted, and the process returns to step S65.

FIG. 27 is an operation flowchart of the compilation timing control information input/determination unit. FIG. 28 illustrates data used by the compilation timing control information input/determination unit.

In FIG. 28, the compilation timing control information of (2) is read from memory used by the virtual machine, and is used. As the compilation timing reference execution frequency of (1), a value that is prescribed at the activation of the virtual machine is used.

In FIG. 27, the compilation timing control information input/determination unit is activated before a method is called. In step S80, whether or not the compilation timing control information has been read is determined. When the result in step S80 is No, the process proceeds to step S84. When the result in step S80 is Yes, it is determined in step S81 whether or not a program (method) exists in the program (method) identification information of the compilation timing information when the program (method) was called. When the result in step S81 is No, the process proceeds to step S84. When the result in step S81 is Yes, the process proceeds to step S82.

In step S82, the compilation timing adjustment value of the program (method) that was called is extracted from the compilation timing control information. In step S83, it is determined whether or not the execution frequency of a program (method) is equal to or greater than the compilation timing adjustment value extracted from the compilation timing information when the program (method) was called. When the result in step S83 is No, the process terminates. When the result in step S83 is Yes, the process proceeds to step S85.

In step S84, it is determined whether or not the execution frequency of a program (method) is equal to or greater than the reference execution frequency of the compilation timing when the program (method) was called. When the result in step S84 is No, the process terminates. When the result in step S84 is Yes, the process proceeds to step S85. In step S85, a compiler is requested to compile the called program (method).

Figure 29A:
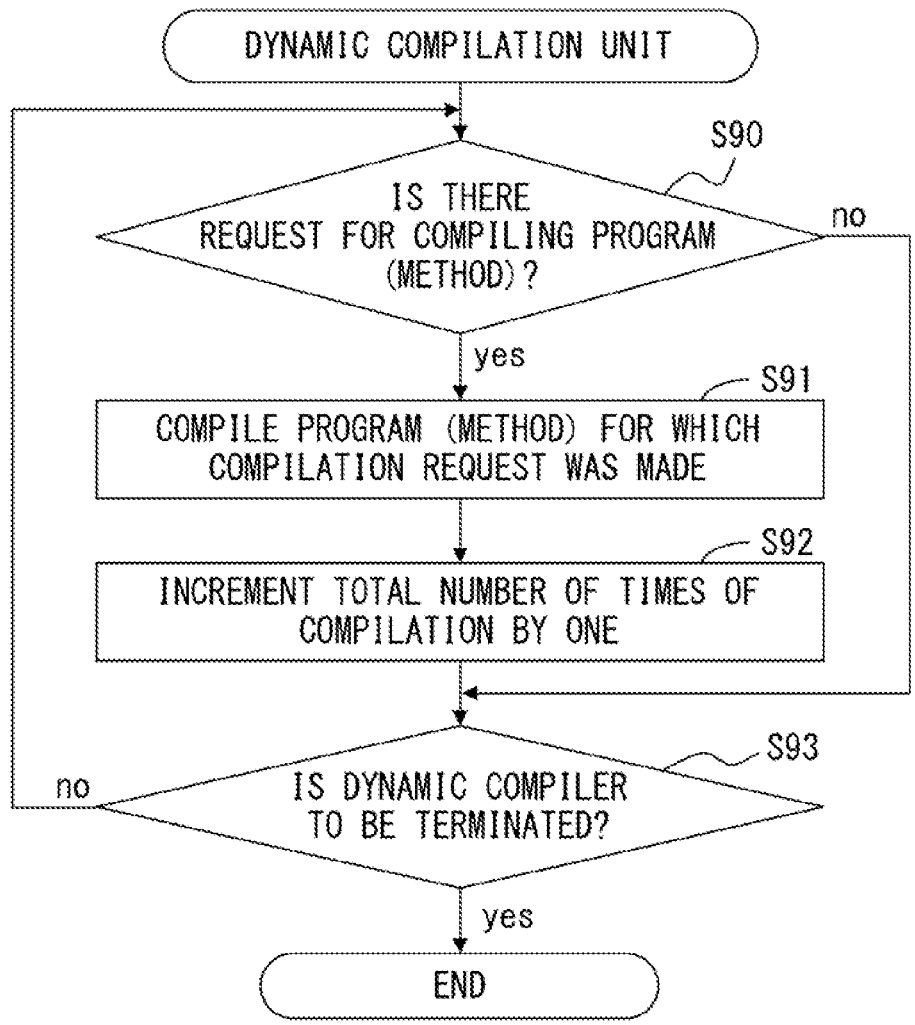

FIGS. 29A and 29B illustrate an operation flowchart of the dynamic compilation unit, and data used by that unit. How to perform compilation in accordance with compilation timing information is controlled by the compilation control information input/determination unit, and the dynamic compilation unit (including a dynamic compiler) executes compilation processes when there is a request for compilation.

The dynamic compilation unit makes a dynamic compiler perform a compilation process, and it also performs a process of counting the total number of times of compilation (FIG. 29B) so that the compilation concentration degree measurement unit illustrated in FIGS. 19A, 19B, and 20 can record the total number of times of compilation.

In FIG. 29A, the dynamic compilation unit determines in step S90 whether or not there is a request for compiling a program (method). When the result in step S90 is No, the process proceeds to step S93. When the result in step S90 is Yes, the dynamic compiler is made in step S91 to compile the program (method) for which the compilation request was made, and the total number of times of compilation (FIG. 29B) is incremented by one. In step S93, whether or not the dynamic compiler is to be terminated is determined. This determination of whether or not the dynamic compiler is to be terminated may also be made in accordance with instructions from users. When the result in step S93 is No, the process returns to step S90, and when the result is Yes, the process terminates.

Figure 30:
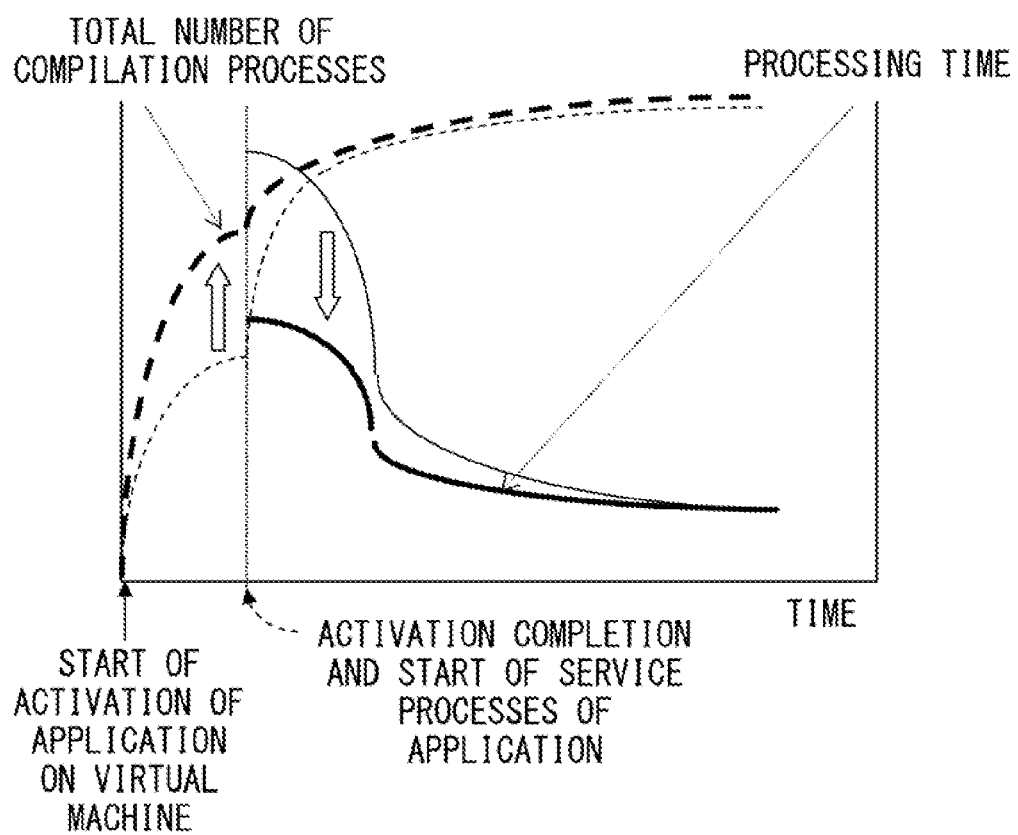
FIG. 30 illustrates effects of the present embodiment (first)
Figure 31:
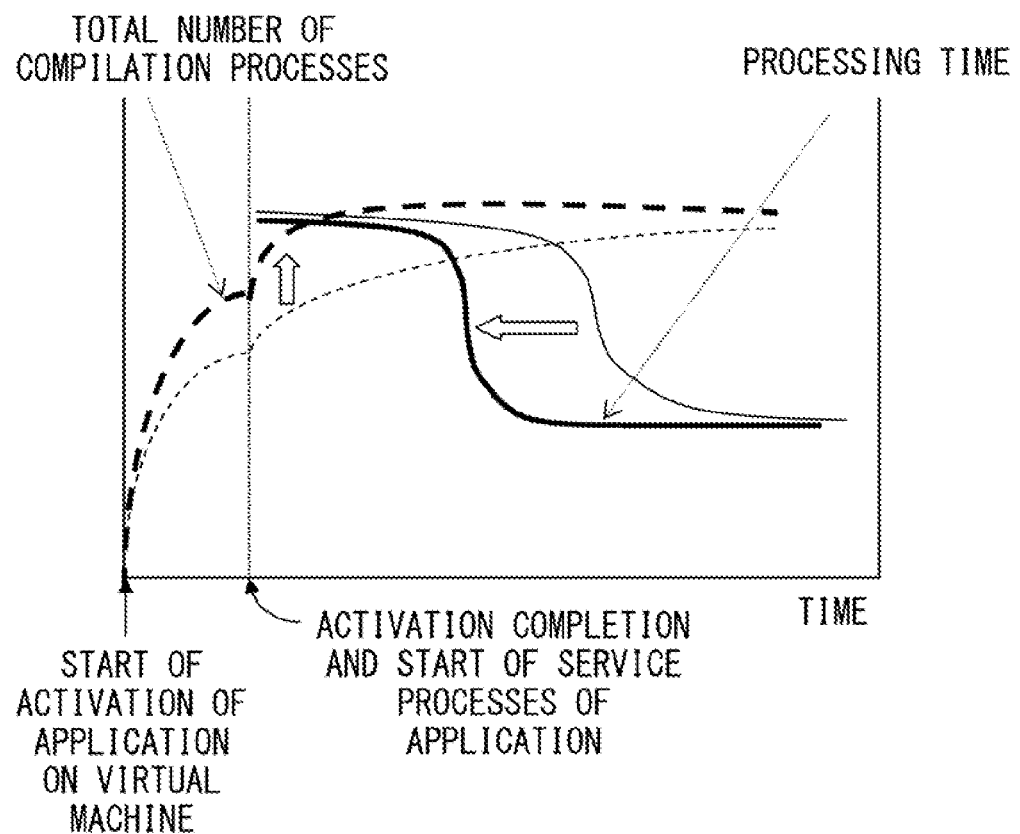
FIG. 31 illustrates effects of the present embodiment (second).

FIGS. 30 and 31 explain the effects of the present embodiment.

By adjusting the timing of performing compilation and by optimizing the balance between execution by an interpreter and execution based on native codes, the execution performance immediately after the activation of an application program becomes stable. It is possible to reduce the ratio of the execution performance drop immediately after the activation of an application program as illustrated in FIG. 30 to the execution performance during a stable period. As illustrated in FIG. 30, the increase in the number of times of dynamic compilation has become greater after the start of the application program activation and before the activation completion or start of services while the number of times of dynamic compilation after the activation completion and start of services has decreased so as to reduce the processing time. Also, as illustrated in FIG. 31, the period before the application program execution performance becomes stable can be shortened. That is, execution of highly important applications is shifted to earlier, from execution by an interpreter to execution based on native codes, and the operations of application programs become stable earlier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An application server that performs dynamic compilation for executing a program, the server comprising a processor that performs a process including:
    an execution performance information obtainment process that obtains execution performance information of the program when the program is executed by an interpreter;
    a compilation timing information setting process that sets compilation timing information for each method included in the program in accordance with information on a performance difference between a time point before a stabilization of an execution of the program and a time point after a stabilization of an execution performance of the program and information on a period that the execution performance stabilizes, the time point before the stabilization of the execution performance being a time point of activation completion of the program, the time point after the stabilization of the execution performance being a time point at which a fluctuation in the number of times of compilation by a dynamic compiler becomes equal to or smaller than a prescribed value, and the information on the performance difference and the information on the period being included in the obtained execution performance information; and
a dynamic compilation process that compiles each method into a native code in accordance with the compilation timing information.

2. The application server according to claim 1, wherein:
the execution performance information obtainment process further includes a method information obtainment process that obtains information on an execution frequency of each method, and information on an importance of each method.

3. The application server according to claim 1, wherein the performance difference is a difference in an average response time of the program.

4. The application server according to claim 2, wherein:
the execution frequency of each method is the number of times of executing each method in per unit of time, and the importance of each method represents a category of each method in accordance with the number of times of executing the method.

5. An application server that performs dynamic compilation for executing a program, the server comprising a processor that performs a process including:
an execution performance information obtainment process that obtains execution performance information of the program when the program is executed by an interpreter;
a compilation timing information setting process that sets compilation timing information for each method included in the program in accordance with information on a period that compilation processes concentrate, the period that compilation processes concentrate being a period from a start of measurement of the number of compilation processes to a time point at which a change ratio of the number of the compilation processes executed per unit of time becomes equal to or smaller than a prescribed value and the information on the period that compilation processes concentrate being included in the obtained execution performance information; and
a dynamic compilation process that compiles each method into a native code in accordance with the compilation timing information.

6. The application server according to claim 5, wherein the information on the period that the compilation process concentrate is obtained based on a change ratio of a degree of concentration of compilation processes, the degree of concentration of compilation processes representing a category of a method in accordance with the number of compilation processes executed per unit of time.

7. An application server that performs dynamic compilation for executing a program, the server comprising a processor that performs a process including:
an execution performance information obtainment process that obtains execution performance information of the program when the program is executed by an interpreter;
a compilation timing information setting process that sets compilation timing information for each method included in the program in accordance with the obtained execution performance information; and
a dynamic compilation process that compiles each method into a native code in accordance with the compilation timing information, wherein the compilation timing information setting process determines a compilation timing adjustment coefficient for each method on the basis of a performance difference between before and after execution a stabilization of an execution performance of the program, a degree of concentration of compilation processes, an importance of each method, and a compilation concentration period influence ratio, which is obtained from (a period that execution performance stabilizes)/(a period that compilation processes concentrate), and multiplies the compilation timing adjustment coefficient by a prescribed value so as to set the compilation timing information.

8. The application server according to claim 7, wherein:
the larger the performance difference is, the smaller the compilation timing adjustment coefficient is made to be.

9. The application server according to claim 7, wherein:
the lower the degree of concentration of compilation processes is, the smaller the compilation timing adjustment coefficient is made to be.

10. The application server according to claim 7, wherein:
the higher the importance of each method is, the smaller the compilation timing adjustment coefficient is made to be.

11. The application server according to claim 7, wherein:
the higher the compilation concentration period influence ratio is, the smaller the compilation timing adjustment coefficient is made to be.

12. A processing method for an application server that performs dynamic compilation for executing a program, wherein:
the application server includes a processor that:
obtains execution performance information of the program when the program is executed by an interpreter;
sets compilation timing information for each method included in the program in accordance with information on a performance difference between a time point before a stabilization of an execution of the program and a time point after a stabilization of an execution performance of the program and information on a period that the execution performance stabilizes, the time point before the stabilization of the execution performance being a time point of activation completion of the program, the time point after the stabilization of the execution performance being a time point at which a fluctuation in the number of times of compilation by a dynamic compiler becomes equal to or smaller than a prescribed value, and the information on the performance difference and the information on the period being included in the obtained execution performance information; and
compiles each method into a native code in accordance with the compilation timing information.

13. A computer-readable, non-transitory storage medium storing a program that makes a computer perform dynamic compilation for executing an application program, wherein:
the computer is made to:
obtain execution performance information of the application program when the application program is executed by an interpreter;
set compilation timing information for each method included in the application program in accordance with information on a performance difference between a time point before a stabilization of an execution of the program and a time point after a stabilization of an execution performance of the program and information on a period that the execution performance stabilizes, the time point before the stabilization of the execution performance being a time point of activation completion of the program, the time point after the stabilization of the execution performance being a time point at which a fluctuation in the number of times of compilation by a dynamic compiler becomes equal to or smaller than a prescribed value, and the information on the performance difference and the information on the period being included in the obtained execution performance information; and compile each method into a native code in accordance with the compilation timing information.

14. A processing method for an application server that performs dynamic compilation for executing a program, wherein:

the application server includes a processor that:

obtains execution performance information of the program when the program is executed by an interpreter;

sets compilation timing information for each method included in the program in accordance with information on a period that compilation processes concentrate, the period that compilation processes concentrate being a period from a start of measurement of the number of compilation processes to a time point at which a change ratio of the number of the compilation processes executed per unit of time becomes equal to or smaller than a prescribed value and the information on the period that compilation processes concentrate being included in the obtained execution performance information; and compiles each method into a native code in accordance with the compilation timing information.

15. A computer-readable, non-transitory storage medium storing a program that makes a computer perform dynamic compilation for executing an application program, wherein:

the computer is made to:

obtain execution performance information of the application program when the application program is executed by an interpreter;

set compilation timing information for each method included in the application program in accordance with information on a period that compilation processes concentrate, the period that compilation processes concentrate being a period from a start of measurement of the number of compilation processes to a time point at which a change ratio of the number of the compilation processes executed per unit of time becomes equal to or smaller than a prescribed value and the information on the period that compilation processes concentrate being included in the obtained execution performance information; and compile each method into a native code in accordance with the compilation timing information.

16. A processing method for an application server that performs dynamic compilation for executing a program, wherein:

the application server includes a processor that:

obtains execution performance information of the program when the program is executed by an interpreter;

sets compilation timing information for each method included in the program in accordance with the obtained execution performance information; and compiles each method into a native code in accordance with the compilation timing information, wherein in the setting the compilation timing information, the processor determines a compilation timing adjustment coefficient for each method on the basis of a performance difference between before and after execution a stabilization of an execution performance of the program, a degree of concentration of compilation processes, an importance of each method, and a compilation concentration period influence ratio, which is obtained from (a period that execution performance stabilizes)/(a period that compilation processes concentrate), and multiplies the compilation timing adjustment coefficient by a prescribed value so as to set the compilation timing information.

17. A computer-readable, non-transitory storage medium storing a program that makes a computer perform dynamic compilation for executing an application program, wherein:

the computer is made to:

obtain execution performance information of the application program when the application program is executed by an interpreter;

set compilation timing information for each method included in the application program in accordance with the obtained execution performance information; and compile each method into a native code in accordance with the compilation timing information, wherein in the setting the compilation timing information, a compilation timing adjustment coefficient for each method is determined on the basis of a performance difference between before and after execution a stabilization of an execution performance of the application program, a degree of concentration of compilation processes, an importance of each method, and a compilation concentration period influence ratio, which is obtained from (a period that execution performance stabilizes)/(a period that compilation processes concentrate), and the compilation timing adjustment coefficient is multiplied by a prescribed value so as to set the compilation timing information.

* * * * *